(12) United States Patent
Choo et al.

(10) Patent No.: US 11,961,508 B2
(45) Date of Patent: Apr. 16, 2024

(54) VOICE INPUT PROCESSING METHOD AND ELECTRONIC DEVICE SUPPORTING SAME

(71) Applicant: Samsung Electronics Co., Ltd., Gyeonggi-do (KR)

(72) Inventors: Heeyoung Choo, Gyeonggi-do (KR); Hyunduk Cho, Gyeonggi-do (KR); Yeseul Hong, Gyeonggi-do (KR); Dayoung Lee, Gyeonggi-do (KR); Boram Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 17/097,046

(22) Filed: Nov. 13, 2020

(65) Prior Publication Data
US 2021/0151031 A1    May 20, 2021

(30) Foreign Application Priority Data
Nov. 15, 2019   (KR) .......................... 10-2019-0146729

(51) Int. Cl.
*G10L 15/04* (2013.01)
*G10L 15/22* (2006.01)

(52) U.S. Cl.
CPC .............. *G10L 15/04* (2013.01); *G10L 15/22* (2013.01)

(58) Field of Classification Search
CPC .... G10L 15/22; G10L 2015/223; G10L 15/26
See application file for complete search history.

(56) References Cited

U.S. PATENT DOCUMENTS

| 6,757,362 | B1* | 6/2004 | Cooper | ................. H04M 3/527 379/88.16 |
| 6,882,973 | B1 | 4/2005 | Pickering | |
| 7,624,016 | B2* | 11/2009 | Ju | ........................... G10L 15/22 704/275 |
| 10,043,516 | B2 | 8/2018 | Saddler et al. | |
| 10,049,665 | B2 | 8/2018 | Lee et al. | |

(Continued)

FOREIGN PATENT DOCUMENTS

| JP | 6-110835 A | 4/1994 |
| JP | 8-146991 A | 6/1996 |

(Continued)

OTHER PUBLICATIONS

International Search Report dated Mar. 5, 2021.
BuzzFeed.News. Amazon Filed a Patent to Record You Before You Even Say "Alexa".

*Primary Examiner* — Mark Villena
(74) *Attorney, Agent, or Firm* — Cha & Reiter, LLC

(57) ABSTRACT

An electronic device and method are disclosed. The electronic device includes a microphone, a speaker and a processor. The processor implements the method, including: receiving a first voice input through the microphone, outputting a response related to a function through the speaker, based on the first voice input, when a second voice input is received through the microphone during output of the response, interrupting the output of the response and continue to receive the second voice input, and executing the function based on content of the received second voice input and content of the response output up to one of: a first time point when the second voice input was initially received, and a second time point when the output of the response was interrupted.

14 Claims, 17 Drawing Sheets

(56) References Cited

U.S. PATENT DOCUMENTS

| | | | |
|---|---|---|---|
| 10,192,546 B1 | 1/2019 | Piersol et al. | |
| 10,418,032 B1 * | 9/2019 | Mohajer | G10L 15/1815 |
| 10,608,687 B2 * | 3/2020 | Kuramochi | G10L 21/04 |
| 10,762,904 B2 | 9/2020 | Toma et al. | |
| 10,839,800 B2 | 11/2020 | Honda et al. | |
| 10,896,679 B1 * | 1/2021 | Hu | G10L 15/063 |
| 2013/0275138 A1 * | 10/2013 | Gruber | G10L 13/00 |
| | | | 704/260 |
| 2014/0310001 A1 * | 10/2014 | Kalns | G10L 15/22 |
| | | | 704/270.1 |
| 2015/0348551 A1 * | 12/2015 | Gruber | G10L 15/1822 |
| | | | 704/235 |
| 2016/0180844 A1 * | 6/2016 | VanBlon | G10L 15/22 |
| | | | 704/275 |
| 2018/0313566 A1 * | 11/2018 | Nemcek | G05B 15/02 |
| 2018/0322872 A1 | 11/2018 | Cha et al. | |
| 2019/0164537 A1 | 5/2019 | Oyaizu | |
| 2020/0051554 A1 | 2/2020 | Kim et al. | |
| 2020/0075016 A1 * | 3/2020 | Goldstein | G06Q 50/30 |
| 2020/0327890 A1 * | 10/2020 | Saito | G10L 15/07 |

FOREIGN PATENT DOCUMENTS

| | | |
|---|---|---|
| JP | 3398401 B2 | 4/2003 |
| JP | 3892302 B2 | 3/2007 |
| JP | 2010-008768 A | 1/2010 |
| KR | 10-2018-0012055 A | 2/2018 |
| KR | 10-2018-0054362 A | 5/2018 |
| KR | 10-1992676 B1 | 6/2019 |
| KR | 10-2019-0118996 A | 10/2019 |

* cited by examiner

VOICE INPUT PROCESSING METHOD AND ELECTRONIC DEVICE SUPPORTING SAME

CROSS-REFERENCE TO RELATED APPLICATION(S)

This application is based on and claims priority under 35 U.S.C. 119 to Korean Patent Application No. 10-2019-0146729, filed on Nov. 15, 2019, in the Korean Intellectual Property Office, the disclosure of which is herein incorporated by reference in its entirety.

BACKGROUND

1) Field

Certain embodiments relate to a voice input processing, and more particularly, to artificial intelligence processing during overlap of audio outputs and voice inputs.

2) Description of Related Art

An artificial intelligence system (or an integrated intelligence system) is a computer system in which learning and determination are performed by a machine itself, so that the more the system is used, the more accurate in recognition the system becomes.

Artificial intelligence technology includes a machine learning technology (e.g., deep learning) that uses an algorithm in which the characteristics of pieces of input data are classified and/or learned via machine learning, and element technologies that simulate functions, such as, for example, recognition and determination processes conducted within the human brain, by using a machine learning algorithm.

The element technologies may include, for example, at least one of a linguistic understanding technology for recognizing the human languages and attendant characters, a visual understanding technology for visually recognizing objects, inference prediction technology for logically inferring and predicting based on information determinations, knowledge representation technology for processing information on human experience into knowledge data, and an operation control technology for controlling autonomous operation of devices, such as a smart vehicle and robotic automata.

The linguistic understanding technology enables performance of recognition, application, and/or processing of human language or characters, and includes natural language processing, machine translation, dialogue systems, question and answer systems, voice recognition or synthesis, and the like.

An electronic device equipped with an artificial intelligence system may analyze voice data input by a user utterance, determine a function to be executed in the electronic device or an external electronic device connected to the electronic device based on the result of the analysis, and support execution of the function by the electronic device or the external electronic device.

The above information is presented as background information only to assist with an understanding of the disclosure. No determination has been made, and no assertion is made, as to whether any of the above might be applicable as prior art with regard to the disclosure.

SUMMARY

When a device receives a voice input via user utterance, it may output an audible response. However, the output of the audible response may interfere with processing of a second voice input from the user, due to, for example audio interference between the output and the second voice input. For example, when a second voice input is received while a response to a first voice input is still being output, the conventional electronic device may be unable to process the second voice input while maintaining output of the response. Accordingly, in this case, only after outputting of the response is ended, the user is allowed to make an utterance for a new command.

Certain embodiments may provide a voice input processing method capable of processing a second voice input received during output of a response according to a first voice input, and an electronic device supporting the same.

An electronic device according to certain embodiments may include a microphone, a speaker, and a processor, wherein the processor is configured to: output a response related to a function through the speaker, based on the first voice input, when a second voice input is received through the microphone during output of the response, interrupt the output of the response and continue to receive the second voice input, and execute the function based on content of the received second voice input, and content of the response output up to at least one of: a first time point when the second voice input was initially received, or a second time point when the output of the response was interrupted.

In addition, a method for processing a voice input by an electronic device according to certain embodiments may include: receiving a first voice input through a microphone, outputting a response related to a function through a speaker, based on the first voice input, when a second voice input is received through the microphone during output the response, interrupting the output of the response and continuing to receive the second voice input, and executing the function based on content of the received second voice input, and content of the response output up to at least one of: a first time point when the second voice input was initially received, or a second time point when the output of the response was interrupted.

According to certain embodiments, it is possible to support immediate execution of a voice command by processing a voice input received during output of a response.

Further, according to certain embodiments, processing for subsequent utterances can be immediately performed even during outputting of the response and conversation or questions and answers with a user can be continued smoothly. Accordingly, the usability of a service using voice can be increased.

Furthermore, various effects that are directly or indirectly understood through the current document can be provided.

BRIEF DESCRIPTION OF THE DRAWINGS

The above and other aspects, features, and advantages of certain embodiments will be more apparent from the following description taken in conjunction with the accompanying drawings, in which.

With regard to the description of the drawings, the same or similar reference numerals may be used to refer to the same or similar elements.

DETAILED DESCRIPTION

Figure 1:
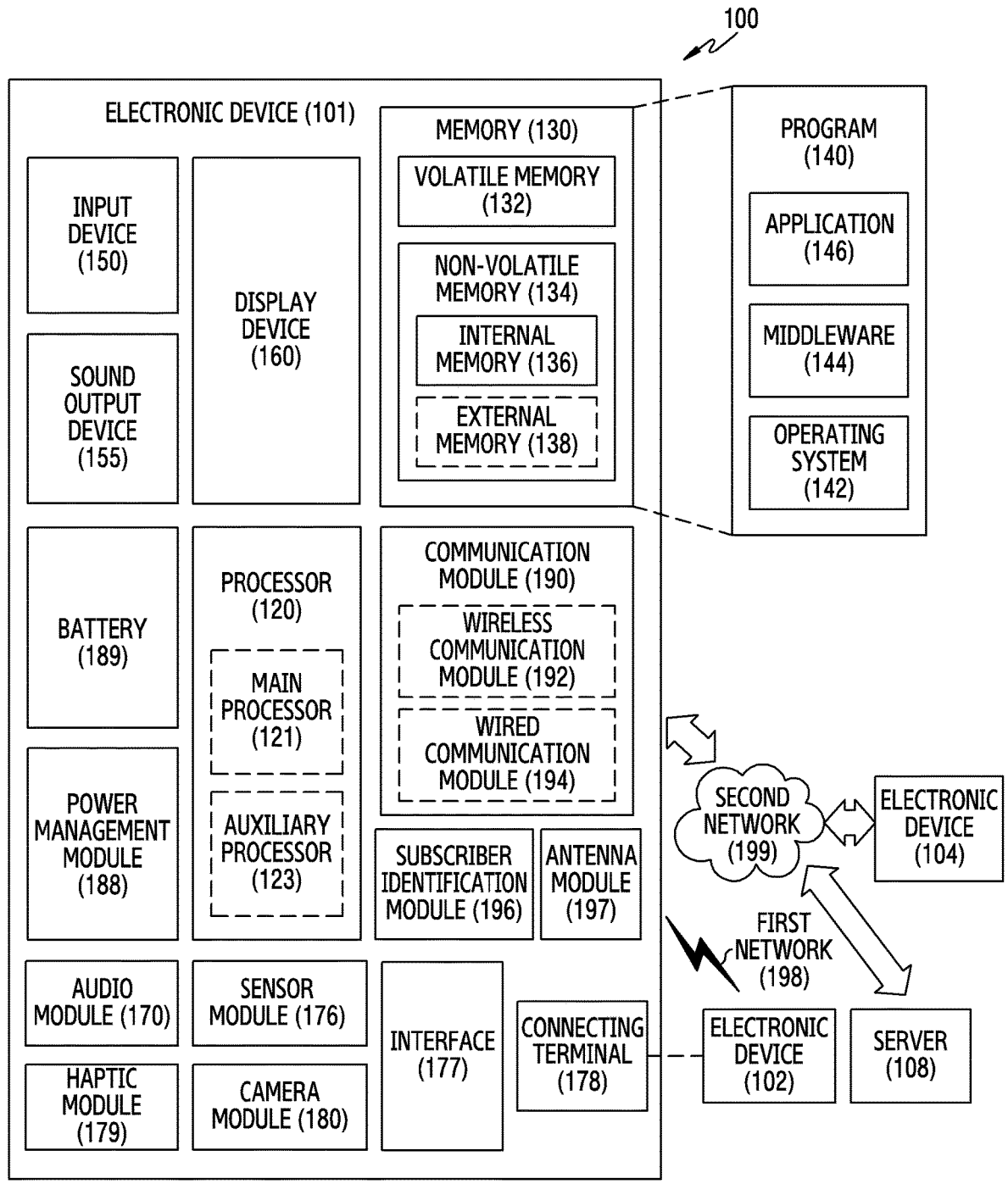
FIG. 1 is a block diagram of an electronic device in a network environment according to certain embodiments.

Hereinafter, certain embodiments will be described with reference to the accompanying drawings. For convenience of explanation, the elements illustrated in the drawings may be inflated or reduced in size, and the disclosure is not necessarily limited by what is illustrated.

FIG. 1 is a block diagram illustrating an example electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155, or an external electronic device (e.g., an electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may implement an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Figure 2:
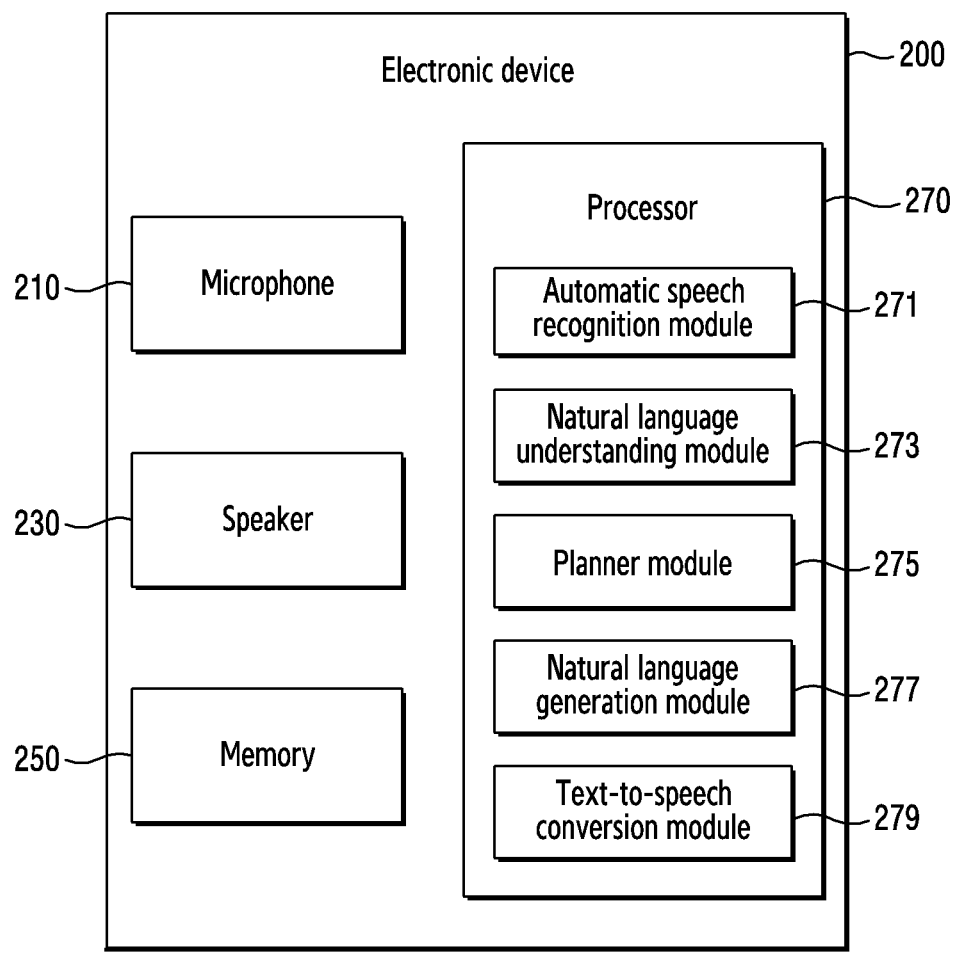
FIG. 2 illustrates an electronic device related to voice input processing according to an embodiment.

FIG. 2 illustrates an electronic device related to voice input processing according to an embodiment.

Referring to FIG. 2, an electronic device 200 (e.g., the electronic device 101) may receive a voice input by a user utterance through a microphone 210 (e.g., the input device 150), and may process the received voice input through a processor 270 (e.g., the processor 120). For example, the processor 270 may convert the received voice input into text data and perform a function corresponding to the received voice input based on the text data. In this process, the processor 270 may output a response to the received voice input, for example, voice data related to performing of the function through a speaker 230 (e.g., the sound output device 155). In addition, when a voice input by a user's subsequent utterance is received while outputting a response to a voice input by the user utterance, the processor 270 may process the received voice input. Accordingly, the electronic device 200 may support immediate execution of the user's voice command by immediately processing the voice input received during response output, and may support smooth continuation of conversations or questions and answers with the user.

The electronic device 200 for performing functions described in the above may include a microphone 210, a speaker 230, a memory 250 (e.g., the memory 130), and a processor 270. However, the configuration of the electronic device 200 is not limited thereto. According to certain embodiments, the electronic device 200 may omit at least one of elements described in the above, and may further include at least one other element. As an example, the electronic device 200 may further include at least one of a communication circuit (e.g., the communication module 190) for communication with an external electronic device, and a display (e.g., the display device 160) capable of displaying a process or result related to performing of the function.

The microphone 210 may receive a sound introduced from the outside, for example, a voice signal (voice input) by a user utterance. In addition, the microphone 210 may convert the received voice signal into an electric signal and transmit the converted electric signal to the processor 270.

The speaker 230 may output sound. For example, the speaker 230 may receive, from the processor 270, an electrical signal corresponding to voice data to be output, may convert the received electrical signal into sound (audio signal), and may output the same.

The memory 250 may store various types of data used by at least one element of the electronic device 200. According to an embodiment, the memory 250 may store at least one application capable of performing various functions. According to another embodiment, the memory 250 may store instructions and data related to processing of a voice input. In this case, when executed by the processor 270, the instructions may cause the processor 270 to perform a function corresponding to the instructions, that is, a function related to processing of a voice input.

The processor 270 may control at least one other element of the electronic device 200 and may perform various data processing or operations. According to an embodiment, the processor 270 may receive a voice input by a user utterance through the microphone 210, and may process the received voice input. In addition, the processor 270 may convert the received voice input into text data, and may perform a function corresponding to the received voice input based on the text data. According to another embodiment, the processor 270 may output a response to the received voice input, for example, voice data related to performing of the function, through the speaker 230.

The processor 270 for performing the functions described above may include an automatic speech recognition module (an ASR module) 271, a natural language understanding module (an NLU module) 273, and a planner module 275, a natural language generator module (an NLG module) 277, and a text-to-speech conversion module (TTS module) 279.

The automatic speech recognition module 271 may convert a voice input received through the microphone 210 into text data. For example, the automatic speech recognition module 271 may include an utterance recognition module. The utterance recognition module may include an audio (acoustic) model and a language model. For example, the audio model may include information related to phonation, and the language model may include unit phoneme information and information relating to a combination of pieces of unit phoneme information. The utterance recognition module may convert a user utterance into text data by using information related to phonation and information related to a unit phoneme.

The natural language understanding module 273 may identify a user's intention by using text data of voice input. For example, the natural language understanding module 273 may determine the user intention by performing a syntactic analysis or semantic analysis. According to an embodiment, the natural language understanding module 273 may identify the meaning of a word extracted from text data, by using a linguistic feature (e.g., a syntactic element) of a morpheme or phrase, and may determine the user intention by matching the meaning of the identified word to the intention.

The planner module 275 may generate a plan by using the intention and parameters determined by the natural language understanding module 273. According to an embodiment, the planner module 275 may determine a plurality of domains utilized to perform a task (or a function) based on the determined intention. The planner module 275 may determine a plurality of operations included in each of the plurality of domains determined based on the intention. According to an embodiment, the planner module 275 may determine a parameter utilized to execute the determined plurality of operations or a result value output by executing the plurality of operations. The parameter and the result value may be defined as a concept of a designated type (or class). Accordingly, the plan may include a plurality of operations and a plurality of concepts determined by the intention of the user. The planner module 275 may determine a relationship between the plurality of operations and the plurality of concepts in a gradational manner (or a hierarchical manner). For example, the planner module 275 may determine an execution sequence of the plurality of operations determined based on the user intention, based on the plurality of concepts. In other words, the planner module 275 may determine the execution sequence of the plurality of operations based on parameters utilized for execution of the plurality of operations and a result output from the execution of the plurality of operations. Accordingly, the planner module 275 may generate a plan including related information (e.g., ontology) between the plurality of operations and the plurality of concepts.

The natural language generation module 277 may change designated information into a text format. The information changed in the text format may be a form of natural language utterance. The designated information may be, for example, information for guiding completion of an operation (or function execution) corresponding to a voice input by the user utterance or information for guiding an additional input by the user (e.g., feedback information for the user input). The information changed in the text format may be transferred to the text-to-speech conversion module 279 to be changed into information in the voice format.

The text-to-speech conversion module 279 may change information in the text format into information in the voice format. For example, the text-to-speech conversion module 279 may convert text data into voice data. The text-to-speech conversion module 279 may receive information in the text format from the natural language generation module 277, may convert the information in the text format into information in the voice format (voice data), and may output the voice data to the speaker 230.

As described above, the processor 270 may convert the voice input received through the microphone 210 into text data through the automatic speech recognition module 271, may identify the user intention by using the converted text data through the natural language understanding module 273, and may determine a function (or task) to be performed, based on the identified user's intention, through the planner module 275. In addition, the processor 270 may output, through the speaker 230, a response to the user utterance corresponding to the voice input received through the microphone 210. For example, the processor 270 may change information on the determined function, as the response, into a text format through the natural language generation module 277, may change the information, which has been changed into the text format, into voice data through the text-to-speech conversion module 279, and may output the voice data through the speaker 230. The information on the function may include, for example, information for guiding the process or completion of the function execution or information for guiding input of additional information utilized for the function execution.

The processor 270 may interrupt outputting of the response when receiving a voice input by a user's subsequent utterance through the microphone 210 while outputting the response through the speaker 230. According to an embodiment, the processor 270 may determine whether the contents of the user's subsequent utterance match the context of a current conversation, and if not, the processor 270 may maintain outputting of the response. For example, if text data corresponding to the voice input by the subsequent utterance does not include text data related to a function associated with the response, the processor 270 may control to maintain outputting of the response through the speaker

230. According to an embodiment, the processor 270 may store a time point at which the outputting of the response is interrupted.

After interrupting the outputting of the response, the processor 270 may determine whether an object for implementation of a function to be performed by the voice input by the subsequent utterance is specified. For example, the processor 270 may determine whether text data corresponding to the voice input by the subsequent utterance includes text data indicating the object for implementation of the function. When the object for implementation of the function is specified, the processor 270 may perform the function by using the specified object for implementation of the function. When the object for implementation of the function is not specified, the processor 270 may perform the function by determining the object for implementation of the function based on the voice input by the subsequent utterance and contents of the response, which has been made up to a first time point at which the voice input by the subsequent utterance is received or a second time point at which the outputting of the response is interrupted.

According to an embodiment, if the response includes a plurality of optional elements, the processor 270 may determine, as the object for implementation of the function, the last optional element, which has been output before a first time point at which the voice input by the subsequent utterance is received, among the plurality of optional elements. For example, if the response sequentially includes a first optional element, a second optional element, and a third optional element, and the voice input by the subsequent utterance is received at a time point at which the second optional element has been output through the speaker 230, the processor 270 may determine the second optional element as the object for implementation of the function. In some embodiments, when there is an optional element currently being output at the first time point, the processor 270 may output, through the speaker 230, voice data requesting to select one of the optional element currently being output and the last optional element having output before the optional element currently being output. For example, if the response sequentially includes the first optional element, the second optional element, and the third optional element, and the voice input by the subsequent utterance is received at a time point at which the third optional element is being output through the speaker 230, the processor 270 may output, through the speaker 230, voice data requesting to select one of the second optional element having been output and the third optional element currently being output. In this case, when the user selects one of the second optional element and the third optional element, the processor 270 may determine the optional element, selected by the user, as the object for implementation of the function.

According to an embodiment, if the response includes a plurality of optional elements, and text data corresponding to the voice input by the subsequent utterance includes text data of a particular turn in a sequence in which the plurality of optional elements are output, the processor 270 may determine, as the object for implementation of the function, an optional element corresponding to a particular turn among the plurality of optional elements. For example, if the response sequentially includes a first optional element, a second optional element, and a third optional element, and text data indicating cardinal or ordinal number (e.g., "the second") is included in text data corresponding to the voice input by the subsequent utterance, the processor 270 may determine an optional element of the corresponding turn (e.g., a second optional element positioned in the second turn) as the object for implementation of the function. As another example, if the response sequentially includes a first optional element, a second optional element, and a third optional element, the voice input by the subsequent utterance is received at a time point at which the second optional element is being output through the speaker 230 or at a time point at which the second optional element has been output, and text data corresponding to the voice input by the subsequent utterance includes text data (e.g., "previous one") indicating a previous optional element or a next optional element, the processor 270 may determine, as the object for implementation of the function, an optional element of the corresponding turn (e.g., a first optional element positioned before the second optional element currently being output or having been output).

According to an embodiment, if the response includes a plurality of optional elements, and text data of a previous turn or a next turn is included in text data corresponding to the voice input received through the microphone 210, the processor 270 may change an optional element having started being output among the plurality of optional elements into an optional element of the corresponding turn. For example, if the response sequentially includes a first optional element, a second optional element, and a third optional element, and the voice input by the user utterance is received through the microphone 210 at a time point at which the second optional element is being output through the speaker 230, the processor 270 is configured to interrupt outputting of the response. If text data (e.g., "previous") of a previous turn is included in the text data corresponding to the voice input, the processor 270 may control such that the response is output from the first optional element positioned before the second optional element in a sequence. In addition, if text data (e.g., "next") of a next turn is included in the text data corresponding to the voice input, the processor 270 may control such that the response is output from a third optional element positioned after the second optional element in a sequence.

The processor 270 may determine whether information for performing the function is utilized. According to an embodiment, in the process of determining whether the user intention identified through the natural language understanding module 273 is clear, the processor 270 may determine whether the user intention is clear based on whether sufficient parameter information exists, and may determine whether a parameter identified by the natural language understanding module 273 is sufficient to perform the function. When it is determined that the user intention is not clear, the processor 270 may perform a feedback requesting information utilized to perform the function in order to clearly determine the user intention. For example, the processor 270 may output, through the speaker 230, a response requesting information related to performing of the function. Here, the user may input information related to performing of the function in response to the response, and the processor 270 may perform the function using the input information. For example, if the response includes a request for information related to performing of the function, and text data corresponding to the voice input by the subsequent utterance includes the information, the processor 270 may configure the information by using at least a part of the text data and perform the function by using the configured information.

According to an embodiment, if the response includes a request for confirmation of performing the function, and text data corresponding to the voice input by the subsequent utterance includes text data indicating a positive or negative indication, the processor 270 may immediately perform the function or may not perform the function. As an example, when a voice input is received while outputting the response including a request for confirmation of performing the function, and text data corresponding to the voice input includes text data (e.g., "yes") indicating a positive indication, the processor 270 may interrupt outputting of the response and immediately perform the function. As another example, if a voice input is received while outputting the response including a request for confirmation of performing the function, and text data corresponding to the voice input includes text data (e.g., "no") indicating a negative indication, the processor 270 may interrupt outputting of the response and not perform the function.

According to an embodiment, when the text data corresponding to the voice input by the subsequent utterance includes text data requesting to perform a connected function associated with the above function, the processor 270 may perform the connected function. For example, when a voice input by a subsequent utterance is received during output of a response related to a first function (e.g., an alarm information output function), and text data corresponding to the voice input includes text data requesting performance of a second function (e.g., an alarm deletion function), which is connected with the first function, the processor 270 may immediately perform the second function.

According to an embodiment, if it is determined that the voice input, which has been received while outputting the response, occurs due to an unauthenticated user utterance, the processor 270 may maintain outputting of the response instead of processing the received voice input. Here, the unauthenticated user may denote a user who fails authentication using authentication information stored in the electronic device 200 or authentication through an authentication server.

According to an embodiment, if it is determined that the voice input, which has been received while outputting the response, occurs due to an utterer different from an utterer of the voice input having caused the response, the processor 270 may maintain outputting of the response instead of processing the received voice input. For example, when a second voice input by a second user's utterance is received in a state where the response is output according to a first voice input by a first user's utterance, the processor 270 may maintain outputting of the response instead of processing the second voice input. In some embodiments, when the second user is an authenticated user like the first user, the processor 270 may interrupt outputting of the response and process the second voice input.

According to an embodiment, the electronic device 200 may further include a sensor (e.g., a sensor module 176) capable of detecting a user's gesture. When a user's designated gesture is detected through the sensor, the processor 270 may interrupt outputting of the response, and may be in a standby state so as to receive a voice input by the user's subsequent utterance. In this case, the processor 270 may increase the reception sensitivity of the microphone 210 in order to receive the voice input. According to an embodiment, the sensor may include, for example, at least one of a gesture sensor and an image sensor.

According to an embodiment, when the acquisition of information related to performing of the function fails, the processor 270 may output, through the speaker 230, voice data identifying whether to continuously reproduce the response. For example, when failing to specify an object for implementation of the function or failing to obtain information utilized to perform the function, the processor 270 may output, through the speaker 230, voice data identifying whether to continuously reproduce the response, outputting of which has been interrupted. Here, when the user selects continuous reproduction, the processor 270 may output the response again from the contents corresponding to a time point at which the outputting of the response is interrupted.

As described above, according to certain embodiments, an electronic device (e.g., the electronic device 200) may include a microphone (e.g., the microphone 210), a speaker (e.g., the speaker 230), and a processor (e.g., the processor 270), such that the processor is configured to: output a response related to a function through the speaker, based on a first voice input received through the microphone; when a second voice input is received through the microphone while outputting the response, interrupt outputting of the response; and perform the function based on the received second voice input and contents of the response, which has been made up to at least one of a first time point at which the second voice is received or a second time point at which the outputting of the response is interrupted.

According to certain embodiments, when text data corresponding to the second voice input does not include text data related to the function, the processor may control to maintain outputting of the response through the speaker.

According to certain embodiments, the response includes a plurality of optional elements, and the processor may be configured to determine, as an object for implementation of the function, a first optional element, which has been output at the end before the first time point, among the plurality of optional elements.

According to certain embodiments, when there is a second optional element currently being output at the first time point among the plurality of optional elements, the processor may be configured to output, through the speaker, voice data requesting to select one of the first optional element and the second optional element.

According to certain embodiments, the response includes a plurality of optional elements, and the processor may be configured to, when text data corresponding to the second voice input includes text data indicating a particular turn in a sequence in which the plurality of optional elements are output, determine, as an object for implementation of the function, an optional element corresponding to the particular turn, among the plurality of optional elements.

According to certain embodiments, the response includes a plurality of optional elements, and the processor may be configured to: interrupt outputting of the response when a third voice input is received at a third time point, which is a time point before the first time point, through the microphone while a first optional element, among the plurality of optional elements, having a designated turn in a sequence in which the plurality of optional elements are output is being output; when text data corresponding to the third voice input includes text data indicating a previous turn rather than the designated turn in the sequence, output the response from a second optional element corresponding to the previous turn among the plurality of optional elements; and when the text data corresponding to the third voice input includes text data indicating a next turn rather than the designated turn in the sequence, output the response from a third optional element corresponding to the next turn among the plurality of optional elements.

According to certain embodiments, the response includes a request for information related to performing of the function, and the processor may be configured to, when text data corresponding to the second voice input includes the information, configure the information by using at least a part of the text data.

According to certain embodiments, the response includes a request for confirmation of the execution of the function, and the processor may be configured to perform the function when text data corresponding to the second voice input includes text data indicating a positive indication.

According to certain embodiments, when text data corresponding to the second voice input includes text data requesting to perform a connected function associated with the function, the processor may be configured to perform the connected function.

According to certain embodiments, the processor may be configured to output, through the speaker, voice data identifying whether to continuously output the response when acquisition of information related to performing of the function fails.

Figure 3:
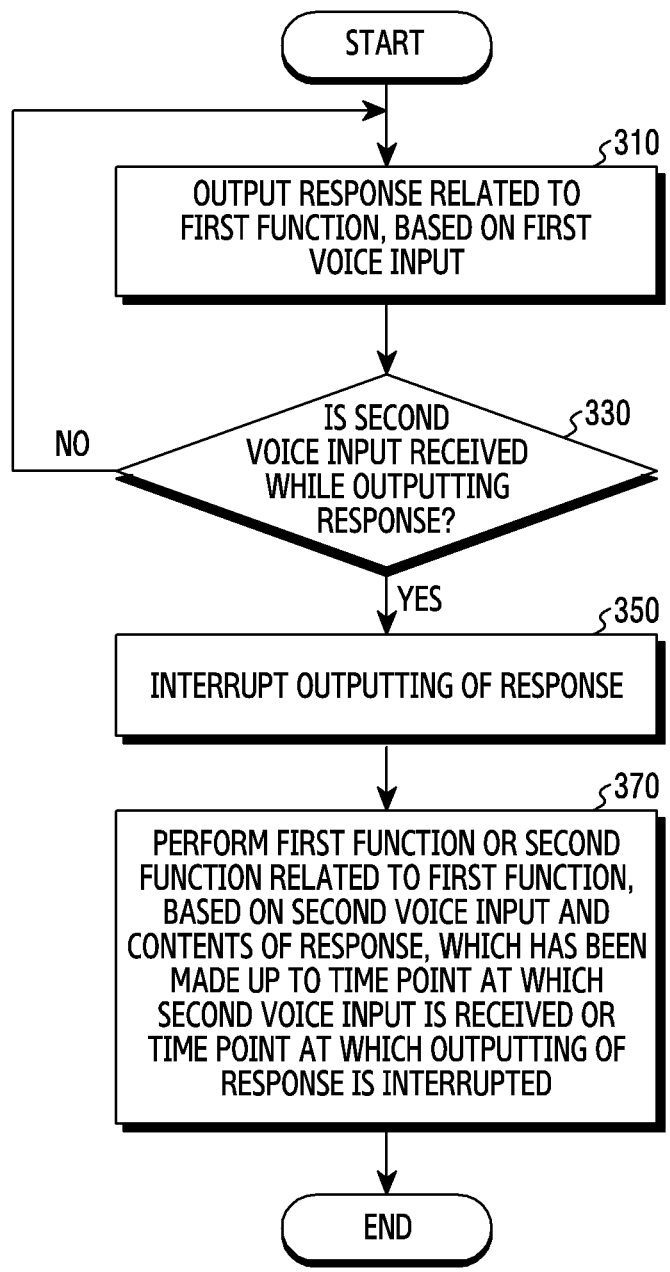
FIG. 3 illustrates a voice input processing method according to an embodiment.

FIG. 3 illustrates a voice input processing method according to an embodiment.

Referring to FIG. 3, in operation 310, a processor (e.g., the processor 270) of an electronic device (e.g., the electronic device 200) may output, through a speaker (e.g., the speaker 230), a response related to a first function, based on a first voice input received through a microphone (e.g., the microphone 210). For example, the processor may receive a first voice input by a user utterance through the microphone, convert the received first voice input into text data through an automatic speech recognition module (e.g., the automatic speech recognition module 271), identify a user intention using the converted text data through a natural language understanding module (e.g., the natural language understanding module 273), to determine a first function to be performed based on the identified user intention through a planner module (e.g., the planner module 275). The processor may output a response related to the determined first function through the speaker. The response may include, for example, information on the function, such as guidance for the process or completion of the function execution, and/or guidance on inputting additional information utilized to execute the function.

In operation 330, the processor may determine whether a second voice input is received while the response is output by the speaker. For example, the processor may determine whether a second voice input by the user's subsequent utterance is received through the microphone in a state where the response is being output. When the second voice input is not received, the processor may return to operation 310 to maintain the response output.

When the second voice input is received, the processor may interrupt the output of the response via the speaker in operation 350. According to an embodiment, the processor may store a time point at which output of the response is interrupted.

In operation 370, the processor may perform the first function or a second function related to the first function, based on the second voice input and contents of the response. The content of the response considered for execution of the function may be the portion of the response output up to a time point at which the second voice input was initially received, or up to a time point at which the output of the response was interrupted. After interrupting the outputting of the response, the processor may determine whether an object for implementation of a function to be performed by the second voice input is specified. For example, the processor may determine whether text data corresponding to the second voice input includes text data indicating an object for implementation of a first function. When the object for implementation of the first function is specified, the processor may perform the first function by using the specified object for implementation of the first function. When the object for implementation of the first function is not specified, the processor may perform the first function by determining the object for implementation of the first function based on the second voice input and contents of the response, which has been made up to a first time point at which the second voice input is received or a second time point at which the outputting of the response is interrupted. If text data corresponding to the second voice input includes text data requesting performing a second function connected with the first function, the processor may perform the second function.

With regards to the operation of determining the object for implementation of the first function, a case in which the response includes a plurality of optional elements will be described. According to an embodiment, the processor may determine, as the object for implementation of the first function, the last optional element, which has been output before a first time point at which the second voice input is received, among the plurality of optional elements. In some embodiments, when there is an optional element currently being output at the first time point, the processor may output, through the speaker, voice data requesting to select one of the optional element currently being output and the last optional element having output before the optional element currently being output. Here, when the user selects one of the two optional elements, the processor may determine the optional element selected by the user as the object for implementation of the function. According to an embodiment, if text data corresponding to the second voice input includes text data of a particular turn in a sequence in which the plurality of optional elements are output, the processor may determine, as the object for implementation of the function, an optional element corresponds to a particular turn among the plurality of optional elements.

Figure 4:
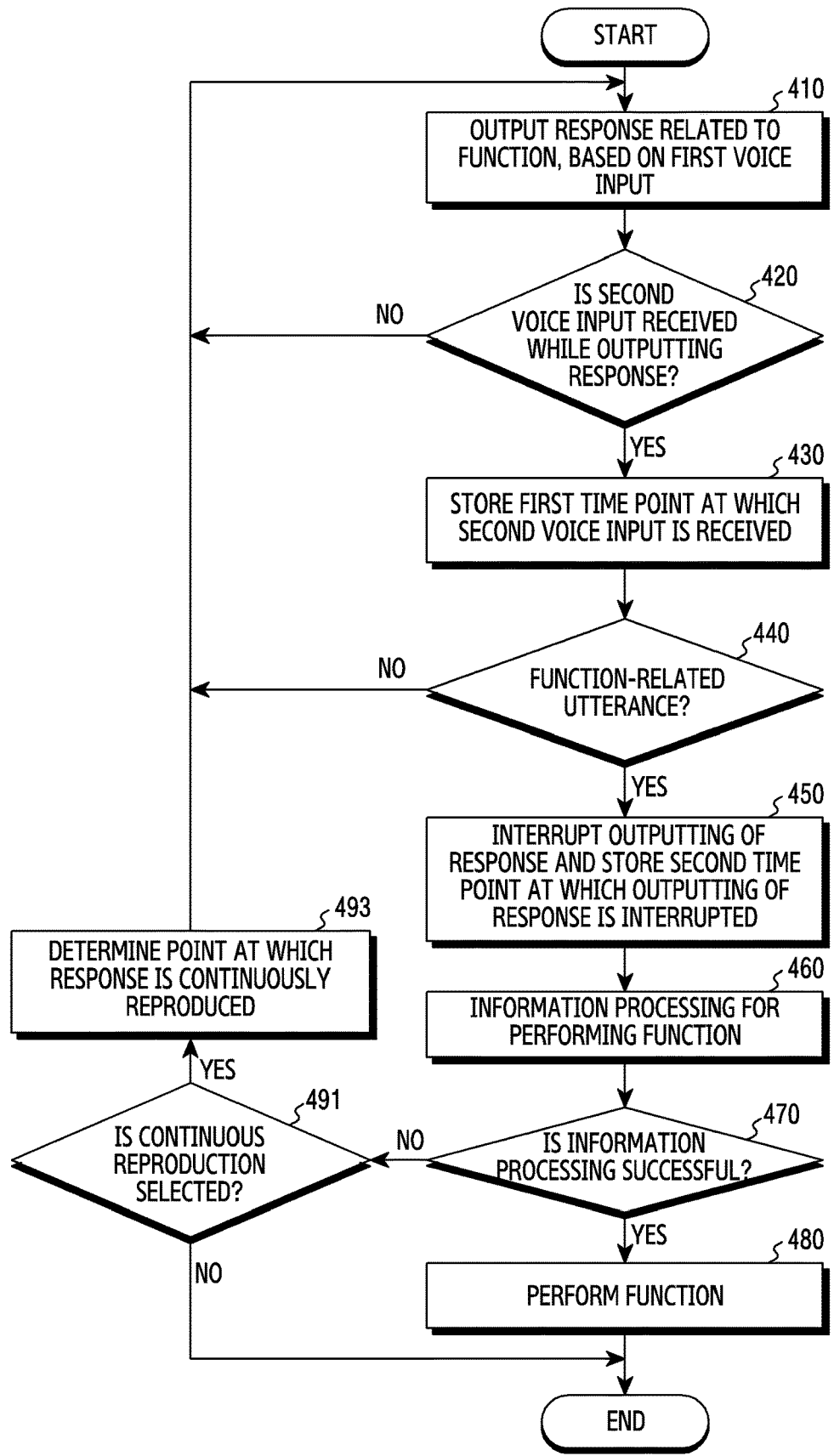
FIG. 4 illustrates a voice input processing method according to another embodiment.

FIG. 4 illustrates a voice input processing method according to another embodiment. Some of the operations of FIG. 4 may be the same as or similar to the operations described in FIG. 3. Accordingly, descriptions of operations, which are the same as or similar to those of FIG. 3, among the operations of FIG. 4 will be omitted.

Referring to FIG. 4, in operation 410, a processor (e.g., the processor 270) of an electronic device (e.g., the electronic device 200) may output, through a speaker (e.g., the speaker 230), a response related to a function, based on a first voice input received through a microphone (e.g., the microphone 210).

In operation 420, the processor may determine whether a second voice input is received during output of the response. For example, the processor may determine whether a second voice input corresponding to a user's subsequent (i.e., second) utterance is received through the microphone, in a state in which the response is being output.

When the second voice input is not received, the processor may return to operation 410 to maintain output of the response.

When the second voice input is initially received, the processor may store a first time point at which the second voice input is received in operation 430. For example, the processor may store information on the first time point in a memory (e.g., the memory 250).

In operation 440, the processor may determine whether the subsequent utterance is related to a function. For example, the processor may determine whether the contents of the subsequent utterance correspond with a context of a current conversation. The processor may determine whether text data generated from the second voice input by the subsequent utterance (e.g., via speech-to-text) includes any text that is related to the function. If text data generated from the second voice input includes text data related to the function, the processor may determine that the subsequent utterance is an utterance related to the function, and if the text data generated from the second voice input does not include text data related to the function, the processor may determine that the subsequent utterance is not an utterance related to the function.

If the subsequent utterance is not related to a function, the processor may return to operation 410 to maintain output of the response.

If the subsequent utterance is related to a function, the processor may interrupt output of the response and store a second time point marking when the output of the response is interrupted in operation 450. For example, the processor may store information on the second time point in a memory.

In operation 460, the processor may process information for performing the function. For example, the processor may determine an object for implementation of the function and may obtain additional information related to performing of the function. An operation of processing information for performing the function will be described in detail with reference to FIG. 6.

In operation 470, the processor may determine whether processing of the information for executing the function is successful. When the information processing for executing the function is successful, the processor may execute the function in operation 480.

When the information processing for performing the function fails, the processor may determine whether continuous reproduction (output) of the response is selected in operation 491. According to an embodiment, the processor may output, through the speaker, voice data for identifying whether to continuously reproduce the response. For example, when failing to specify an object for implementation of the function or failing to obtain information utilized to perform the function, the processor may output, through the speaker, voice data identifying whether to continuously reproduce (output) the response, outputting of which has been interrupted. In addition, the processor may receive a voice input by a user utterance through the microphone, and if text data corresponding to the voice input includes text data indicating a positive indication for the continuous reproduction of the response, the processor may determine that the continuous reproduction is selected.

When the continuous reproduction is selected, the processor may determine a point at which the response is continuously reproduced in operation 493. For example, the processor may identify information on the second time point stored in the memory. When the information on the second time point is identified, the processor may return to operation 410 and output the response again from the contents corresponding to the second time point at which the outputting of the response is interrupted, by using the information on the second time point.

Figure 5:
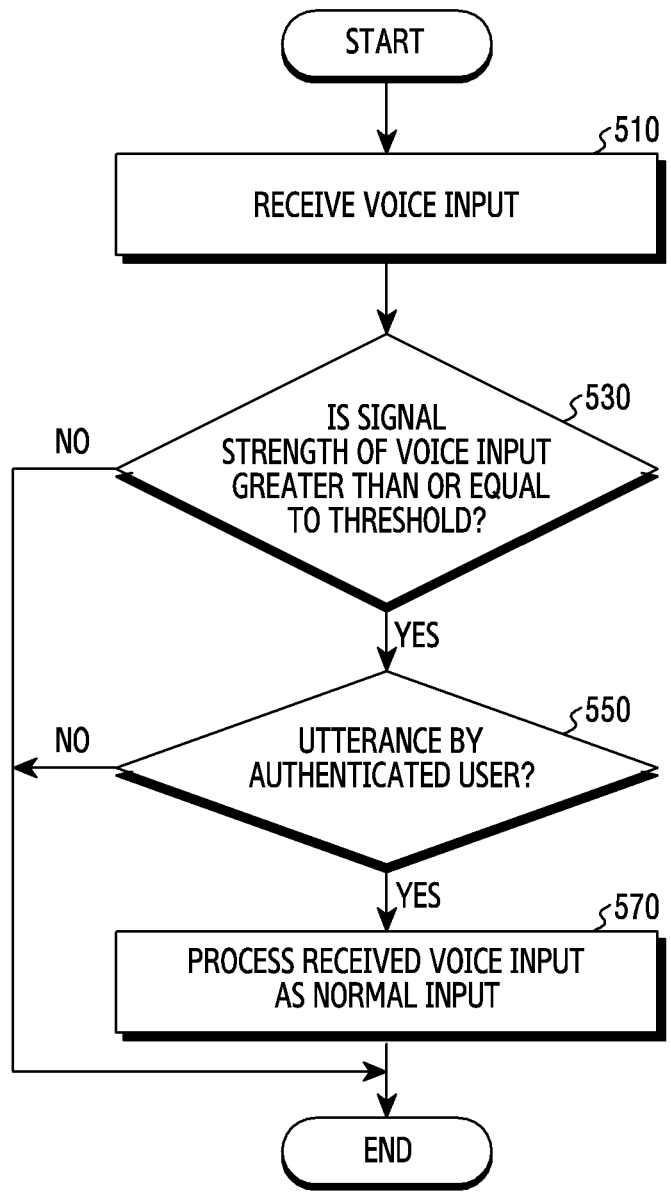
FIG. 5 illustrates a method for determining the validity of a voice input according to an embodiment.

FIG. 5 illustrates a method of determining the validity of a voice input according to an embodiment.

Referring to FIG. 5, in operation 510, a processor (e.g., the processor 270) of an electronic device (e.g., the electronic device 200) may receive a voice input corresponding to a user utterance through a microphone (e.g., the microphone 210).

In operation 530, the processor may determine whether the signal strength of the voice input is equal to or greater than a threshold value. For example, by determining whether the signal strength of the voice input is equal to or greater than the threshold value, the processor may determine whether the user utterance is ambient noise, or a low "signal to noise ratio" (SNR) speech that was not directed toward the electronic device. When the signal strength of the voice input is less than the threshold value, the processor may determine that the user utterance is ambient noise or a speech that is not directed toward the electronic device, and may ignore the same.

According to an embodiment, the processor may remove a signal corresponding to a response from the received voice input before performing operation 530. For example, the processor may remove the signal corresponding to the response from the voice input received while outputting the response through the speaker (e.g., the speaker 230). According to an embodiment, the processor may separate a voice input by the user utterance and a signal corresponding to the response by using a self-interference cancellation technique.

When the signal strength of the voice input is equal to or greater than the threshold value, the processor may determine whether the user utterance is an authenticated user utterance in operation 550. That is, the processor may determine whether the user is an authenticated user. According to an embodiment, the processor may determine whether the user is an authenticated user through authentication based on authentication information stored in the electronic device or authentication through an authentication server.

When the user utterance is the authenticated user utterance, the processor may process the received voice input as a normal voice input in operation 570. If the user utterance is not an authenticated user utterance, the processor may not process the received voice input.

According to an embodiment, if it is determined that the voice input received while outputting the response through the speaker occurs by the same utterer as the utterer of the voice input having caused the response, the processor may process the received voice input as a normal input. Alternatively, the processor may not process the received voice input if it is determined that the voice input received while outputting the response through the speaker occurs by an utterer different from an utterer of the voice input having caused the response. For example, in order to prevent confusion in a multi-user environment, the processor may process the voice input when the subject of the first utterance makes a subsequent utterance.

Operations 530 to 570 described above may be performed between operations 330 and 350 of FIG. 3. In addition, operations 530 to 570 described above may be performed between operations 420 and 450 of FIG. 4.

Figure 6:
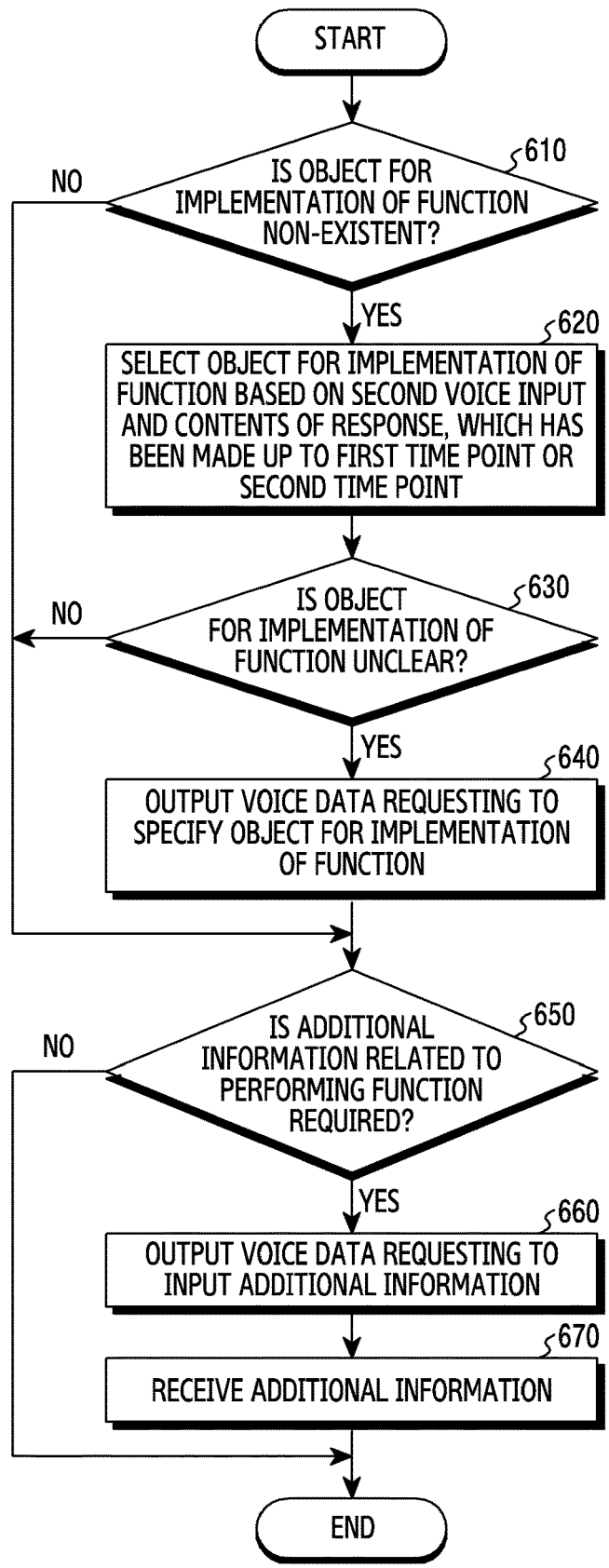
FIG. 6 illustrates an information processing method for performing a function according to an embodiment.

FIG. 6 illustrates an information processing method for performing a function according to an embodiment.

Referring to FIG. 6, in operation 610, a processor (e.g., the processor 270) of an electronic device (e.g., the electronic device 200) may determine whether or not an object for implementation of a function is included in a user utterance. For example, the processor may determine whether or not text data generated from a second voice input corresponding the user utterance, received through a microphone (e.g., the microphone 210), indicates an object for implementation of a function. An "object" may indicate some requisite information, or command, etc.

If the object for implementation of the function exists (i.e., when the object for implementation of the function is specified), the processor may perform operation 650.

If the object for implementation of the function does not exist (i.e., if the object for implementation of the function is not specified), the processor may select (or determine) the object for implementation of the function based on the second voice input and a partial content of the response that was output up to a first time point at which the second voice input is initially received, or up to a second time point at which the output of the response was interrupted, in operation 620.

According to an embodiment, when the response includes a plurality of optional elements, the processor may select (or determine) the last optional element, which has been output before a first time point at which the second voice input is received, among the plurality of optional elements. For example, when the response sequentially includes a first optional element, a second optional element, and a third optional element, and the second voice input is received at a time point at which the second optional element has been output through the speaker (e.g., the speaker 230), the processor may determine the second optional element as the object for implementation of the function.

In operation 630, the processor may determine whether the object for implementation of the function is unclear. For example, if the response includes a plurality of optional elements, and an optional element currently is output at the first time point marking when the second voice input is initially received, the processor may determine that the object for implementation of the function is unclear. For example, the processor may be in capable of determining whether to select, as the object for executing the function, the optional element currently being output, or a previous optional element that was output before the currently-output optional element.

When the object for implementation of the function is unclear, the processor may output, through the speaker, voice data (e.g., an audial prompt) requesting specification of the object for execution of the function. That is, the processor may request the user to specify the object for implementation of the function. For example, when the response sequentially includes a first optional element, a second optional element, and a third optional element, and the second voice input is received at a time point at which the third optional element is being output through the speaker, the processor may output, through the speaker, voice data requesting to select either the last second optional element having output or the third optional element currently being output. In this case, when the user selects one of the two optional elements, the processor may determine the optional element selected by the user as the object for implementation of the function.

When the object for implementation of the function is selected (or determined), the processor may determine whether additional information (e.g., a parameter) related to performing of the function is utilized in operation 650. According to an embodiment, in the process of determining whether the user intention identified through the natural language understanding module (e.g., the natural language understanding module 273) is clear, the processor may determine whether the user intention is clear based on whether or not parameter information is sufficient, and may determine whether a parameter identified in the natural language understanding module is sufficient to perform a function.

When additional information related to performing of the function is utilized, the processor may output, through the speaker, voice data requesting input of the additional information in operation 660. In addition, in operation 670, the processor may receive the additional information. For example, when voice data requesting input of the additional information is output through the speaker, the user may utter additional information, and the user utterance including the additional information may be received as a voice input through the microphone. Here, when text data corresponding to the voice input includes the additional information, the processor may configure additional information related to performing of the function by using at least a part of the text data, and may perform the function by using the configured additional information.

As described above, according to certain embodiments, a method for processing a voice input by an electronic device (e.g., the electronic device 200) may include: outputting a response related to a function through a speaker (the speaker 230) included in the electronic device, based on a first voice input received through a microphone (e.g., the microphone 210) included in the electronic device; interrupting outputting of the response when a second voice input is received through the microphone while outputting the response; and performing the function based on the received second voice input and contents of the response, which has been made up to at least one of a first time point at which the second voice is received or a second time point at which the outputting of the response is interrupted.

According to certain embodiments, the voice input processing method may further include controlling to maintain outputting of the response through the speaker when text data corresponding to the second voice input does not include text data related to the function.

According to certain embodiments, the voice input processing method may further include determining, as an object for implementation of the function, a first optional element, which has been output at the end before the first time point, among a plurality of optional elements included in the response.

According to certain embodiments, the voice input processing method may further include outputting, through the speaker, voice data requesting to select one of the first optional element and a second optional element when there is the second optional element currently being output at the first time point among the plurality of optional elements.

According to certain embodiments, the voice input processing method may further include determining, as an object for implementation of the function, an optional element corresponding to a particular turn in a sequence in which a plurality of optional elements included in the response are output, among the plurality of optional elements when text data corresponding to the second voice input includes text data indicating the particular turn.

According to certain embodiments, the voice input processing method may further include: interrupting outputting of the response when a third voice input is received at a third time point, which is a time point before the first time point, through the microphone, while a first optional element, among a plurality of optional elements included in the response, having a designated turn in a sequence in which the plurality of optional elements are output is being output; when text data corresponding to the third voice input includes text data indicating a previous turn rather than the designated turn in the sequence, outputting the response from a second optional element corresponding to the previous turn among the plurality of optional elements; and when the text data corresponding to the third voice input includes text data indicating a next turn rather than the designated turn in the sequence, outputting the response from a third optional element corresponding to the next turn among the plurality of optional elements.

According to certain embodiments, the response includes a request for information related to performing of the function, and the voice input processing method may further include, when text data corresponding to the second voice input includes the information, configuring the information by using at least a part of the text data.

According to certain embodiments, the response includes a request for confirming of the performing of the function, and the voice input processing method may further include performing the function when text data corresponding to the second voice input includes text data indicating a positive indication.

According to certain embodiments, the voice input processing method may further include, when text data corresponding to the second voice input includes text data requesting to perform a connected function associated with the function, performing the connected function.

According to certain embodiments, the voice input processing method may further include outputting, through the speaker, voice data identifying whether to continuously output the response when acquisition of information related to performing of the function fails.

Figure 7:
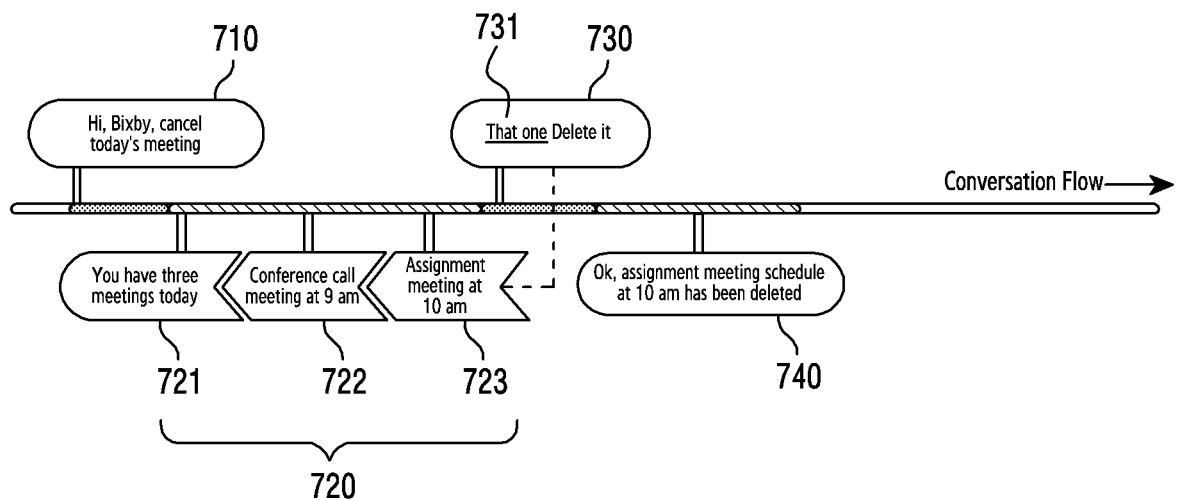
FIG. 7 illustrates a method for processing a voice input for which an object for implementation of a function is not specified according to an embodiment.

FIG. 7 illustrates a method for processing a voice input for which an object for implementation of a function is not specified according to an embodiment.

Referring to FIG. 7, a processor (e.g., the processor 270) of an electronic device (e.g., electronic device 200) may receive a first voice input 710 by a user utterance through a microphone (e.g., the microphone 210). In addition, the processor may convert the first voice input 710 into text data through an automatic speech recognition module (e.g., the automatic speech recognition module 271), identify user intention by using the converted text data through a natural language understanding module (e.g., the natural language understanding module 273), and determine a function to be performed based on the identified user intention through a planner module (e.g., the planner module 275).

The processor may output a first response 720 to a user utterance corresponding to the first voice input 710 through a speaker (e.g., the speaker 230). For example, the processor may convert information on the determined function, as the first response 720, into a text format through a natural language generation module (e.g., the natural language generation module 277), and may convert the information, which has been changed into the text format, into voice data through a text-to-speech conversion module (e.g., the text-to-speech conversion module 279) to output the voice data through the speaker.

FIG. 7 illustrates a state in which the first voice input 710 includes a request for canceling a meeting schedule (e.g., "Cancel today's meeting"), and as a first response 720 thereto, a request for selecting a meeting schedule to be deleted from among a plurality of meeting schedules (e.g., "You have three meetings today. Conference call meeting at 9 am (the rest is omitted)") is output. Here, cancellation of a meeting schedule may be a function to be performed, and one meeting schedule among the plurality of meeting schedules may be an object for implementation of the function. The first response 720 may include information on the number of meeting schedules 721 configured in the electronic device (e.g., "You have three meetings today"), and first meeting schedule information 722 (e.g., "conference call meeting 9 am"), second meeting schedule information 723 (e.g., "assignment meeting 10 am"), and third meeting schedule information (not shown) according to the information on the number of meeting schedules 721. Here, the first meeting schedule information 722, the second meeting schedule information 723, and the third meeting schedule information may be selectable elements.

When the first response 720 includes a plurality of optional elements (e.g., the first meeting information 722, the second meeting information 723, and the third meeting information), the processor may determine, as an object for implementation of the function, the last optional element, which has been output before a first time point at which a second voice input 730 by a user's subsequent utterance is received, among the plurality of optional elements. For example, when the second voice input 730 is received at a time point at which a second optional element (e.g., the second meeting information 723) has been output through the speaker while performing the first response 720, the processor may determine the second optional element as an object for implementation of the function.

Here, text data (e.g., "delete that one") corresponding to the second voice input 730 may include text data (e.g., "delete") related to the function to be performed. In addition, the text data corresponding to the second voice input 730 may not include text data specifying an object for implementation of the function or may include a demonstrative pronoun 731 (e.g., "that one") indicating an object for implementation of the function. Since the demonstrative pronoun 731 fails to specify the object for implementation of the function (e.g., "cancel today's meeting"), the processor determines, as the object for implementation of the function, the last optional element that was output before a time point at which the second voice input 730 was initially received in the conversation flow, which in this case, is the "Assignment meeting at 10 am" 723.

When the object for implementation of the function is determined, the processor may perform the function by using the determined object for implementation of the function. For example, the processor may cancel a meeting schedule corresponding to the second meeting information 723 (e.g., delete the second meeting information 723 stored in the electronic device). In addition, the processor may output a confirmation of the result of execution the function, through the speaker, as a second response 740 to the user's subsequent utterance corresponding to the second voice input 730. The second response 740 may include, for example, voice data indicating successful cancellation of the meeting schedule corresponding to the second meeting information 723 (e.g., "Ok, assignment meeting schedule at 10 am has been deleted").

Figure 8:
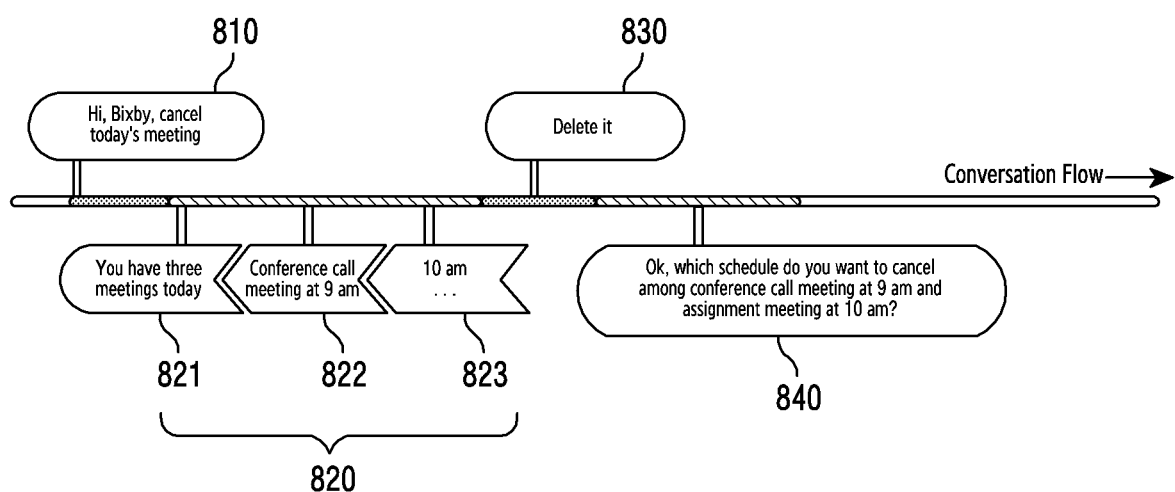
FIG. 8 illustrates a method for processing a voice input for which an object for implementation of a function is unclear according to another embodiment.

FIG. 8 illustrates a method for processing a voice input for which an object for implementation of a function is unclear according to another embodiment.

Referring to FIG. 8, a processor (e.g., the processor 270) of an electronic device (e.g., the electronic device 200) may receive a first voice input 810 by a user utterance through a microphone (e.g., the microphone 210), convert the first voice input 810 into text data, identify user intention by using the converted text data, and determine a function to be performed based on the identified user intention. In addition, the processor may output, through a speaker (e.g., the speaker 230), a first response 820 to the user utterance corresponding to the first voice input 810.

Similarly to FIG. 7, FIG. 8 illustrates a state in which the first voice input 810 includes a request for executing the function of canceling a scheduled meeting (e.g., "Cancel today's meeting"). A first response 820 is output accordingly, including a sequence of scheduled meetings to allow a user to select a scheduled meeting for cancellation (e.g., "You have three meetings today. Conference call meeting at 9 am; Conference call meeting at 9 AM, . . . 10 AM, etc. is output). Here, cancellation of a meeting schedule may be the function to be performed, and one meeting schedule among the plurality of meeting schedules may be determined to be the object for implementation of the function. In addition, the first response 820 may include information on the number of meeting schedules 821 configured in an electronic device (e.g., "You have three meetings today"), and first meeting schedule information 822 (e.g., "conference call meeting 9 am"), second meeting schedule information 823 (e.g., "10 am (the rest is omitted)"), and third meeting schedule information (not shown) according to the information on the number of meeting schedules 821. Here, the first meeting schedule information 822, the second meeting schedule information 823, and the third meeting schedule information may be selectable elements.

When the first response 820 includes a plurality of optional elements (e.g., the first meeting information 822, the second meeting information 823, and the third meeting information), and there is an optional element currently being output at a first time point at which the second voice input 830 by the user's subsequent utterance is received among the plurality of optional elements, the processor may output, through the speaker, a second response 840 for requesting to select one of the optional element currently being output and the last optional element having output before the optional element currently being output. For example, if a second voice input 830 includes text data (e.g., "delete") related to the function to be performed, and is received in between output of the first optional element (e.g., the first meeting information 822) and the second optional element (e.g., the second meeting information 823), it may be unclear whether the object for execution of the function to be performed is the first optional element or the second optional element (e.g., 822, or 823). Accordingly, the processor may output, as the second response 840, voice data (e.g., an audial prompt) requesting selection of the first optional element or the second optional element (e.g., "Yes, which schedule you want to cancel among conference call meeting at 9 am and assignment meeting at 10 am?") through the speaker.

When a third voice input by a further user utterance is received through the microphone after outputting the second response 840, and text data corresponding to the third voice input includes a new indication of an optional element from among the first optional element and the second optional element, the processor may determine the newly indicated optional element to be the object for implementation of the function. In addition, when the object for implementation of the function is determined, the processor may perform the function by using the determined object for implementation of the function. For example, the processor may cancel a meeting schedule selected by the user (e.g., delete meeting information corresponding to a meeting schedule selected by a user from the electronic device).

Figure 9:
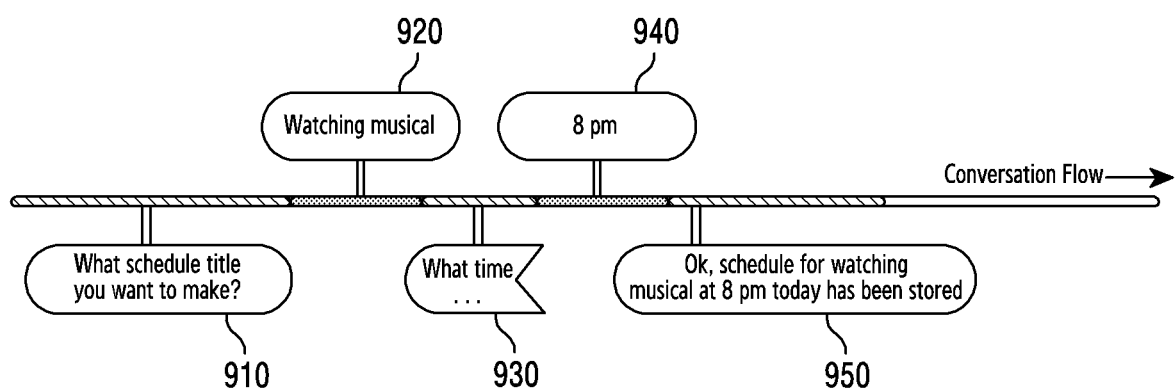
FIG. 9 illustrates a method for processing a voice input including additional information related to performing of a function according to an embodiment.

FIG. 9 illustrates a method for processing a voice input including additional information related to performing of a function according to an embodiment.

Referring to FIG. 9, a processor (e.g., the processor 270) of an electronic device (e.g., the electronic device 200) receives a voice input by a user utterance through a microphone (e.g., microphone 210), convert the voice input into text data, identify user intention by using the converted text data, and determine a function to be performed based on the determined user intention.

In addition, the processor may determine whether information for performing the function is utilized. According to an embodiment, in the process of determining whether the user intention identified through a natural language understanding module (e.g., the natural language understanding module 273) is clear, the processor may determine whether the user intention is clear based on whether or not parameter information is sufficient, and may determine whether a parameter identified in the natural language understanding module is sufficient to perform a function. When it is determined that the user intention is not clear, the processor may perform feedback requesting information utilized to perform the function in order to clearly determine the user intention. For example, the processor may output responses 910 and 930 requesting information related to performing of the function through a speaker (e.g., the speaker 230). Here, in response to the responses 910 and 930, the user may input information related to performing of the function (indicated by reference numerals 920 and 940), and the processor 270 may perform the function by using the input information.

FIG. 9 illustrates a state in which, as a response to a request for configuring a schedule, a first response 910 (e.g., "What schedule title you want to make?") for requesting first information (e.g., a schedule title) related to schedule configuration and a second response 930 (e.g., "What time do you want?") for requesting second information (e.g., a schedule time) are output, and in response to the responses, a first voice input 920 and a second voice input 940 by the user utterance are received, respectively.

When the responses 910 and 930 include a request for information related to performing of the function, and text data (e.g., "watching a musical" or "8 pm") corresponding to the voice inputs 920 and 940 by the user's subsequent utterance includes the information, the processor may configure the information by using at least a part of the text data, and perform the function using the configured information. Here, when the voice inputs 920 and 940 are received while the responses 910 and 930 are still being output, the processor may interrupt the output of the responses 910 and 930, and configure information related to execution of the function, by using text data generated from the voice inputs 920 and 940. For example, as shown in FIG. 9, when the second voice input 940 includes time information for scheduling, and is received during the output of the second response 930 which requests a schedule time, the processor may interrupt output of the second response 930, and may configure the scheduled time using the generated text data (e.g., "8 pm") from the second voice input 940.

When all the information related to performing of the function is configured, the processor may perform the function by using the configured information. For example, the processor may configure the schedule (e.g., store the schedule in the electronic device) by using the schedule title and the schedule time. In addition, the processor may output the result of performing the function, as a third response 950, through the speaker. The third response 950 may include, for example, voice data (e.g., "Ok, watching a musical at 8 pm this evening, I saved the schedule") indicating the result of configuration of the schedule.

Figure 10:
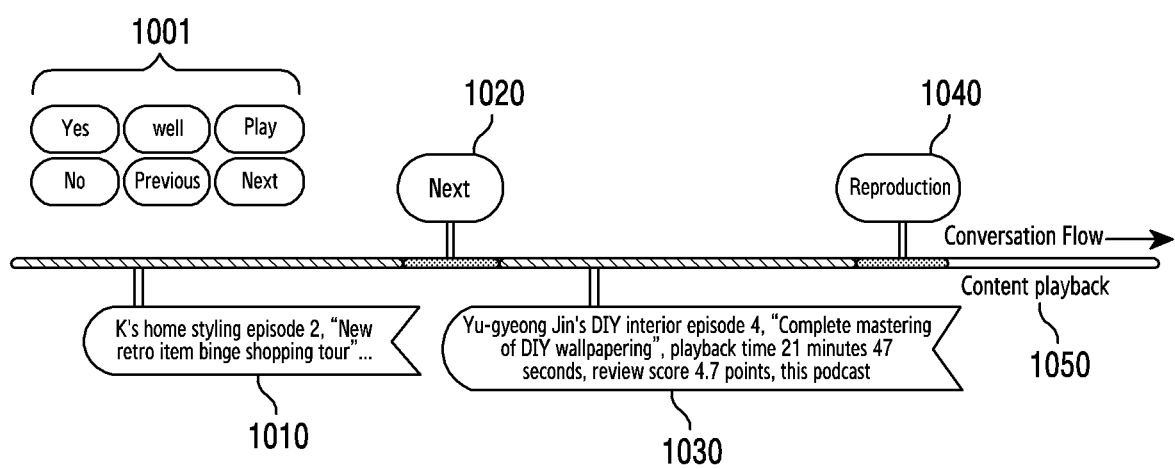
FIG. 10 illustrates a method for processing a voice input including main instructions according to an embodiment.

FIG. 10 illustrates a method for processing a voice input including a main command according to an embodiment.

Referring to FIG. 10, a processor (e.g., the processor 270) of an electronic device (e.g., the electronic device 200) may output responses 1010 and 1030 to a user utterance through a speaker (e.g., the speaker 230). The responses 1010 and 1030 may be part of a plurality of optional elements for presentation to a user that are arranged in sequence. For example, when the voice input by the user utterance includes a request for a list of reproducible contents (e.g., entertainment media), a sequence of potential reproducible content may be output, including the responses 1010 and 1030. FIG. 10 illustrates a state in which the responses 1010 and 1030 include the reproducible first content information 1010 (a first optional element corresponding to a first media broadcast) and second content information 1030 (a second optional element corresponding to a first media broadcast).

When the responses 1010 and 1030 include a plurality of optional elements (e.g., the first content information 1010 and the second content information 1030), and text data generated from a first voice input 1020 received through a microphone (e.g., the microphone 210) indicates a previous or next turn (e.g., "previous" or "next"), the processor may change the present optional element that is output to another optional element in the sequence, according to the indicated turn in the sequence (e.g., previous or next). For example, when the responses 1010 and 1030 sequentially include a first optional element (e.g., the first content information 1010), a second optional element (e.g., the second content information 1030), and a third optional element, and the first voice input 1020 by the user utterance is received through the microphone at a time point at which the first optional element (e.g., the first content information 1010) is being output through the speaker, the processor 270 may interrupt outputting of the first optional element (e.g., the first content information 1010). In addition, if text data corresponding to the first voice input 1020 includes text data (e.g., "next") of a next turn, the processor may control the text data to be output from the second optional element (e.g., the second content information 1030) positioned next to the first optional element.

If text data corresponding to the second voice input 1040 received through the microphone includes text data indicating a definite answer, a request, a positive indication, or a negative indication of the function execution. (e.g., "reproduce", "yes", "well", or "no") while outputting the responses 1010 and 1030, the processor may interrupt outputting of the responses 1010 and 1030. When the text data indicates a confirmation, a request, or a positive indication, the processor may immediately perform the indicated function, or when the text data indicates a negative indication, the processor may not perform the function. For example, a second voice input 1040 is received while the second optional element (e.g., the second content information 1030) included in the responses 1010 and 1030 is being output, and text data corresponding to the second voice input 1040 includes text data (e.g., "reproduce") indicating a request for performing the function, the processor may interrupt outputting of the second optional element (e.g., the second content information 1030), and may reproduce a content (e.g., initiate playback of media corresponding to the second content) corresponding to the second optional element (indicated by reference numeral 1050).

The voice input (e.g., the first voice input 1020 or the second voice input 1040) described in FIG. 10 may be a voice input including main instructions (or Meta commands) 1001 configured in the electronic device. The main instructions 1001 are related to an utterance frequently and widely used by a user, and may include at least one of optional instructions (e.g., "all" or "entire") for selecting all of a plurality of optional elements, navigation instructions (e.g., "previous" or "next") for determining the current output turn in a sequence in which the plurality of optional elements are output, instructions for indicating a positive indication about function execution (e.g., "yes" or "well"), instructions for indicating a negative indication (e.g., "no") about function execution, or instructions (e.g., "reproduce") requesting function execution. When the main instructions 1001 are input, the processor may interrupt outputting of the responses 1010 and 1030 and process the main instructions 1001.

Figure 11:
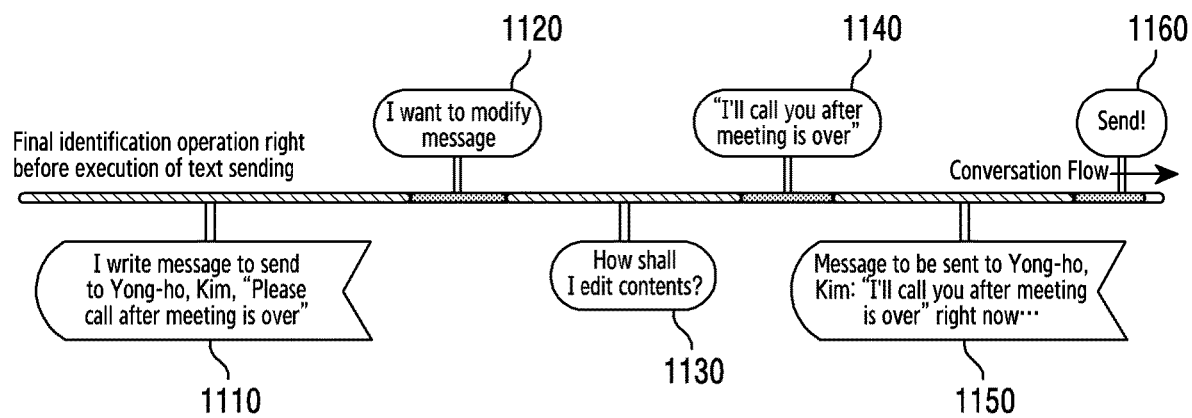
FIG. 11 illustrates a method for processing a voice input including an incomplete request for performing a function according to an embodiment.

FIG. 11 illustrates a method for processing a voice input including an incomplete request for performing a function according to an embodiment.

Referring to FIG. 11, a processor (e.g., the processor 270) of an electronic device (e.g., the electronic device 200) may output, as a first response 1110 to a user utterance, first voice data (e.g., I write a message to send to Yong-ho, Kim: 'please call after a meeting is over') indicating the result of execution of a function (e.g., a message writing function) through a speaker (e.g., the speaker 230). In this regard, the user may request to change the result of the function execution, in response to the first response 1110. For example, the processor may receive a first voice input 1120 by an utterance requesting the change through a microphone (e.g., the microphone 210).

If text data (e.g., "I want to edit a message") corresponding to the first voice input 1120 does not include information (e.g., message contents to be edited) utilized to perform a function (e.g., a message-editing function), the processor may output, as a second response 1130, second voice data (e.g., "How shall I edit the contents?") for requesting information to change the message, through the speaker. In this regard, the user may make an utterance to input the requested information in response to the second response 1130. For example, the processor may receive a second voice input 1140 through the microphone.

If text data (e.g., "I will call you after the meeting is over") generated the second voice input 1140 includes information (e.g., message contents to be edited) utilized to perform the function (e.g., the message-editing function), the processor may configure at least a part of the text data using the information; i.e., replacing some of all of the original message with the newly input text. In addition, the processor may perform the function by using the configured information. For example, the processor may edit the contents of the message. In addition, the processor may output, as a third response 1150, a function related to the writing or change of the message, for example, voice data (e.g., Message to be sent to Yong-ho Kim: "I'll call you after the meeting is over". Should I send it right now?) requesting confirmation of the message sending through the speaker. In this regard, in response to the third response 1150, the user may make an utterance for indicating or requesting a definite answer of the function execution. For example, the processor may receive a third voice input 1160 corresponding to text data (e.g., "send") requesting to perform the function through the microphone. When the third voice input 1160 is received during the outputting of the third response 1150, the processor may interrupt outputting of the third response 1150 and immediately perform the function (e.g., in this case, a message sending function).

Figure 12:
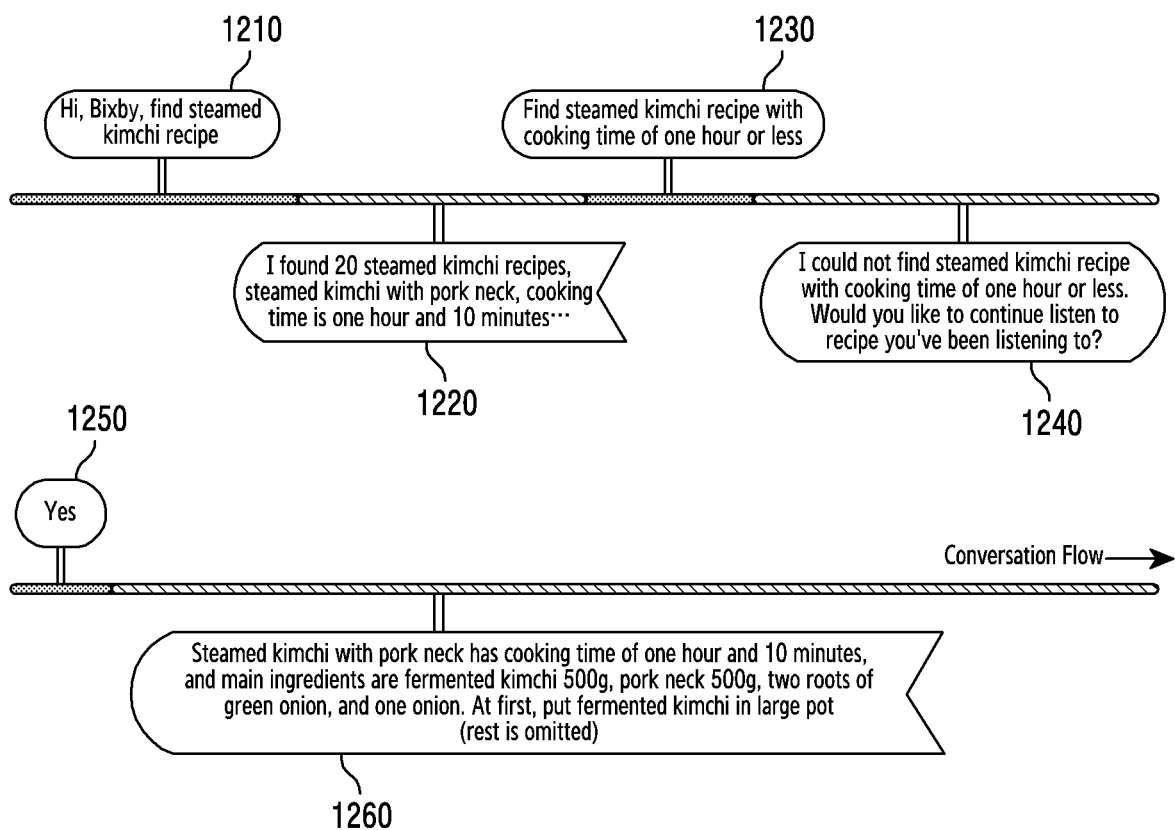
FIG. 12 illustrates a continuous reproduction method for continuously reproducing a response, outputting of which has been interrupted, according to an embodiment.

FIG. 12 illustrates a continuous reproduction method for continuously reproducing a response, outputting of which has been interrupted, according to an embodiment.

Referring to FIG. 12, a processor (e.g., the processor 270) of an electronic device (e.g., the electronic device 200) may receive a first voice input 1210 by a user utterance through a microphone (e.g., the microphone 210).), convert the first voice input 1210 into text data (e.g., "Find steamed kimchi recipe"), identify user intention by using the converted text data, and determine a function to be performed (e.g., a steamed kimchi recipe search function) based on the identified user intention. In addition, the processor may output a response 1220 to the first voice input 1210 through a speaker (e.g., the speaker 230). For example, the processor may output, as the response 1220, information on the retrieved steamed kimchi recipe through the speaker.

While outputting the response 1220, the user may make an utterance requesting change of a search condition. For example, the processor may receive a second voice input 1230 requesting a change in search condition through the microphone. Text data corresponding to the second voice input 1230 may include text data indicating a search condition for requesting a change (e.g., "Find steamed kimchi recipe with cooking time of one hour or less"). When the second voice input 1230 is received while outputting the response 1220, the processor may interrupt output of the response 1220 and search for a new steamed kimchi recipe using the updated search condition.

When acquisition of information related to performing of the function fails, the processor may output, through the speaker, voice data 1240 for identifying whether to continuously reproduce the response 1220. For example, if there is no steamed kimchi recipe satisfying the requested search condition, the processor may output, through the speaker, voice data 1240 (e.g., "I could not find a steamed kimchi recipe with cooking time of one hour or less. Would you like to continuously listen to the recipe you've been listening to?") identifying whether to continuously reproduce the response 1220, the outputting of which has been interrupted. In this regard, when the user selects the continuous reproduction, the processor may output the response 1260 again starting from the contents corresponding to a time point at which the outputting of the response 1220 is interrupted. For example, the processor may receive a third voice input 1250 through the microphone, and when text data corresponding to the third voice input 1250 includes text data (e.g., "yes") indicating a positive indication for the continuous reproduction, the processor may output the response 1260 again.

Figure 13:
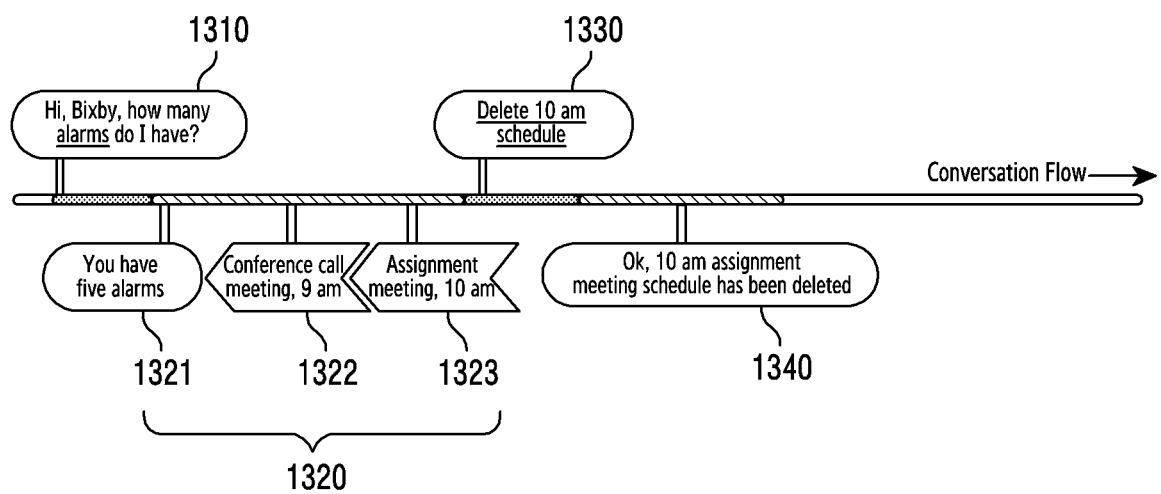
FIG. 13 illustrates a method for processing a voice input related to performing a connected function according to an embodiment.

FIG. 13 illustrates a method for processing a voice input related to performing a connected function according to an embodiment.

Referring to FIG. 13, a processor (e.g., the processor 270) of an electronic device (e.g., the electronic device 200) may receive a first voice input 810 by a user utterance through a microphone (e.g., the microphone 210), convert the first voice input 810 into text data, identify user intention by using the converted text data, and perform a first function to be performed based on the identified user intention. For example, when a user makes an utterance requesting alarm information (e.g., "How many alarms do I have?"), the processor may determine, as a first function to be performed, an output function of alarm information.

The processor may output a first response 1320 to a user utterance corresponding to the first voice input 1310 through a speaker (e.g., the speaker 230). The first response 1320 may include information on the result of performing the first function. For example, the processor may include information on the number of alarms 1321 (e.g., You have five alarms") configured in the electronic device, and first alarm information 1322 (e.g., "Conference call meeting at 9 am"), second alarm information 1323 (e.g., "assignment meeting at 10 am"), third alarm information (not shown), fourth alarm information (not shown), and fifth alarm information (not shown), according to the information on the number of alarms 1321.

The processor may receive a second voice input 1330 according to a user's subsequent utterance through the microphone while outputting the first response 1320. Here, the processor may interrupt output of the first response 1320. For example, when the second voice input 1330 is received while in the midst of outputting the second alarm information 1323 included in the first response 1320, the processor may interrupt output of the second alarm information 1323.

If text data generated from the second voice input 1330 includes a request to execute of a second function connected with the first function, the processor may perform the second function. For example, if text data corresponding to the second voice input 1330 requesting request to delete alarm information (e.g., "Delete schedule at 10:00 am"), the processor may determine whether a function of deleting the alarm function is a second function related to a function of outputting of the alarm information When it is determined that the function of deleting the alarm information is a second function connected with a function of outputting of the alarm information, the processor may perform a function of deleting the alarm information. For example, the processor may delete alarm information corresponding to the text data from the electronic device. When the execution of the second function is completed, the processor may output information on the execution result of the second function as a second response 1340 through the speaker.

Figure 14:
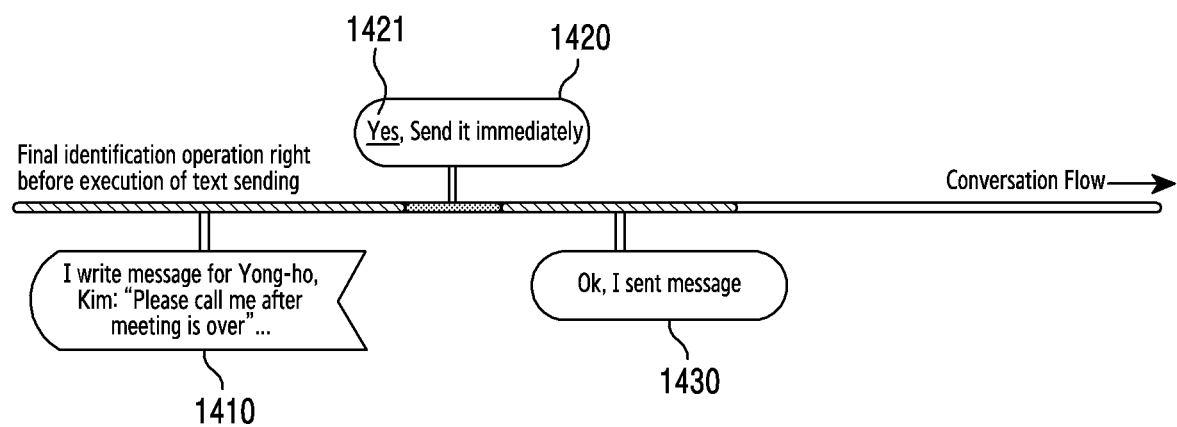
FIG. 14 illustrates a method for processing a voice input including a definite answer for performing a function according to an embodiment.

FIG. 14 illustrates a method for processing a voice input including a definite answer for performing a function according to an embodiment.

Referring to FIG. 14, a processor (e.g., the processor 270) of an electronic device (e.g., the electronic device 200) may output, as a first response 1410 to a user utterance, voice data (e.g., I write a message to send to Yong-ho Kim: 'Please call me when the meeting is over.' Shall I send it as it is?") indicating the result of performing a function (e.g., an confirmation function before message sending) through a speaker (e.g., the speaker 230).

The processor may receive a voice input 1420 by a user's subsequent utterance through a microphone (e.g., the microphone 210) while in the midst of outputting the first response 1410. Here, the processor may interrupt outputting of the first response 1410 based on reception of the user's subsequent utterance. In addition, if text data (e.g., "Yes, send it immediately") generated from the voice input 1420 includes text data 1421 (e.g., "yes") indicates a definite answer or a positive indication for execution of a function (e.g., a message sending function), the processor may immediately perform the requested function. In addition, when the execution of the function is completed, the processor may output, as a second response 1430, information on the result of execution of the function through the speaker.

Figure 15:
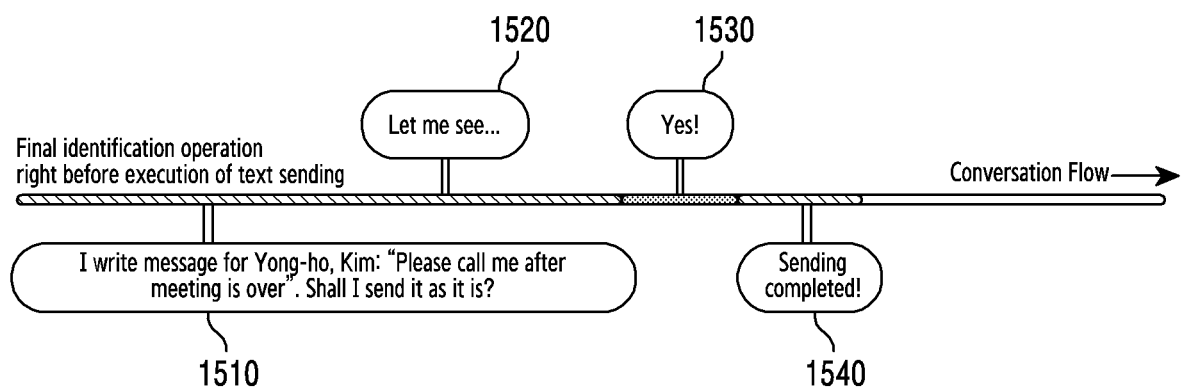
FIG. 15 illustrates a method for processing a voice input that is not related to a function according to an embodiment.

FIG. 15 illustrates a method for processing a voice input that is not related to a function according to an embodiment.

Referring to FIG. 15, a processor (e.g., the processor 270) of an electronic device (e.g., the electronic device 200) may output, as a first response 1510 to a user utterance, voice data (e.g., I write a message to send to Yong-ho Kim: 'I will call you when the meeting is over.' Shall I send it as it is?") indicating the result of the execution of a function (e.g., an confirmation function before message sending) through a speaker (e.g., the speaker 230).

The processor may receive a first voice input 1530 by a user's subsequent utterance through a microphone (e.g., the microphone 210) while outputting the first response 1510.

Here, the processor may interrupt outputting of the first response 1510. In addition, if text data (e.g., "yes") corresponding to the first voice input 1530 includes text data indicating a definite answer or a positive indication for execution of a function (e.g., a message sending function), the processor may immediately perform the above function. In addition, when the execution of the function is completed, the processor may output, as a second response 1540, information on the result of execution of the function through the speaker.

The processor may determine whether text data generated from a second voice input 1520 that is received while outputting the first response 1510 includes text data related to the function. If text data corresponding to the second voice input 1520 includes text data related to the function, the processor may determine that the user utterance generated from the second voice input 1520 is a function-related utterance. In addition, if text data corresponding to the second voice input 1520 does not include text data related to the function, the processor may determine that the user utterance generated from the second voice input 1520 is not a function-related utterance. If it is determined that the user utterance is not the function-related utterance, the processor may maintain and continue output of the first response 1510, and does not process the second voice input 1520.

Figure 16:
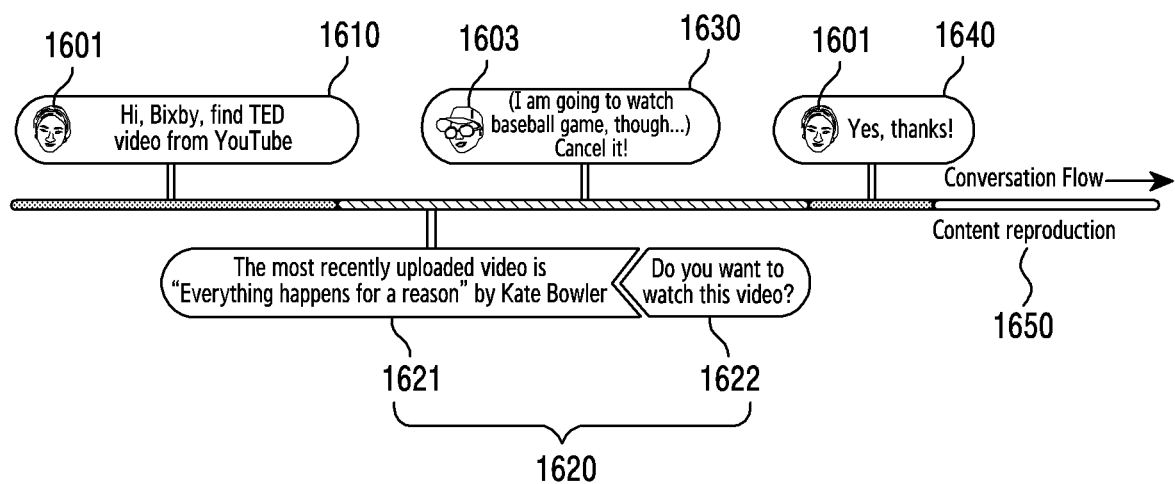
FIG. 16 illustrates a method for processing a voice input by an unauthenticated user utterance according to an embodiment.

FIG. 16 illustrates a method for processing a voice input by an unauthenticated user utterance according to an embodiment.

Referring to FIG. 16, a processor (e.g., the processor 270) of an electronic device (e.g., the electronic device 200) may receive a first voice input 1610 by an utterance of a first user 1601 through a microphone (e.g., the microphone 210) to determine a function to be performed, and may output a response 1620 to the first voice input 1610 through a speaker (e.g., the speaker 230). For example, when the first user 1601 makes an utterance requesting a content search (e.g., "Find a TED video"), the processor may perform a content search function and then output the response 1620 including information on the function execution result (content search result) through the speaker. The response 1620 may include, for example, content search result information 1621 (e.g., "The most recently uploaded video is 'Everything happens for a reason' by Kate Bowler") and information 1622 (e.g., "Would you like to watch this video?") for identifying whether to reproduce the retrieved contents.

If the second voice input 1640 by the subsequent utterance of the first user 1601 is received through the microphone, and text data (e.g., "Yeah, thank you") corresponding to the second voice input 1640 includes text data (e.g., "yes") indicating a definite answer or a positive indication for the function execution, the processor may perform the function. For example, the processor may reproduce the retrieved content (indicated by reference numeral 1650).

When a third voice input 1630 by an utterance of a second user 1603 rather than the first user 1601 is received through the microphone while outputting the response 1620, the processor may maintain output of the response 1620 without processing the third voice input 1630. For example, even though the second user 1603 makes an utterance (e.g., "cancel") requesting cancellation of the executed function while the response 1620 is being output, the processor maintains output of the response 1620, and does not process the third voice input 1630, because the third voice input 1630 is non-authenticated according to origination from the second user 1603, rather than the first user 1601.

According to an alternate embodiment, when the second user 1603 is an authenticated user, similar to the first user 1601, the processor may interrupt output of the response 1620 and process the third voice input 1630 according to the command indicated in the utterance of the second user 1603.

Figure 17:
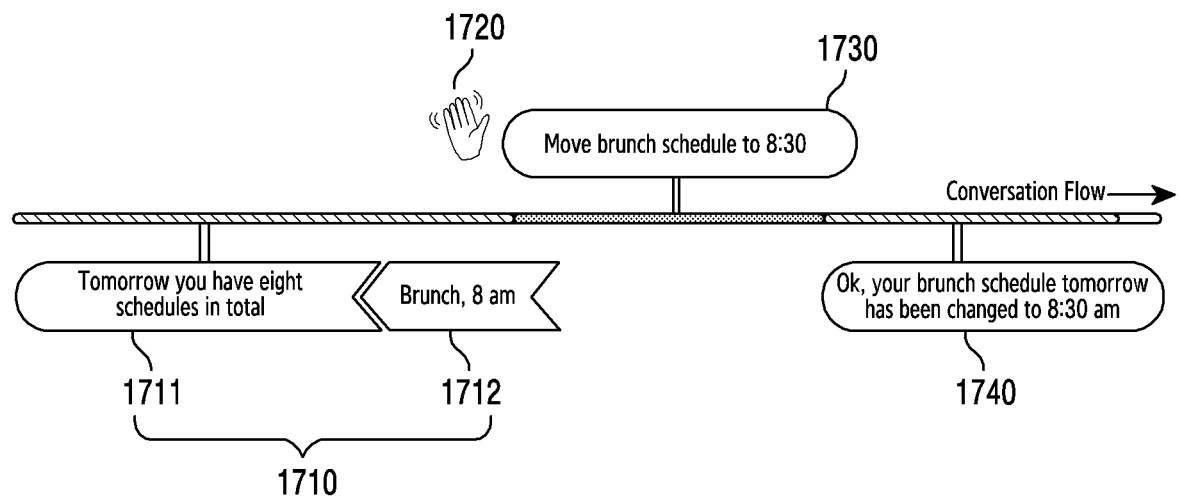
FIG. 17 illustrates a method for processing a designated gesture received during a response according to an embodiment.

FIG. 17 illustrates a method for processing a designated gesture received during a response according to an embodiment.

Referring to FIG. 17, an electronic device (e.g., the electronic device 200) may include a sensor capable of detecting a user's gesture. The sensor may include, for example, at least one of a gesture sensor and an image sensor.

When the user's designated gesture 1720 is detected through the sensor, the processor (e.g., the processor 270) may interrupt output of a first response 1710, and may enter into a standby state ready to receive a voice input 1730 corresponding to the user's subsequent utterance. For example, if the first response 1710 may include information on a number of schedules 1711 stored in the electronic device, and at least one schedule information 1712 according to the information on the number of schedules 1711, and the designated gesture 1720 is detected through the sensor while the at least one schedule information 1712 is being output through a speaker (e.g., the speaker 230), the processor may interrupt output of the at least one schedule information 1712, and enter into a standby state to receive the voice input 1730. According to an embodiment, in the standby state, the processor may increase the reception sensitivity of a microphone (e.g., the microphone 210) to receive the voice input 1730.

Thereafter, when the voice input 1730 is received through the microphone, the processor may perform a function as requested by the voice input 1730. In addition, when the execution of the function is completed, the processor may output information on the execution result of the function as a second response 1740 through the speaker.

The electronic device according to certain embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separated and disposed to other component. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a microphone;
   a speaker; and
   a processor,
   wherein the processor is configured to:
   receive a first voice input through the microphone;
   output a response to the first voice input related to a function through the speaker, based on the first voice input, wherein the response includes a plurality of optional elements that are output in a consecutive sequence of turns;
   when a second voice input is received through the microphone during output of the response so that two or more of the plurality of optional elements are output, interrupt the output of the response and continue to receive the second voice input;
   based on the second voice input, select one of a first optional element currently being output upon the second voice input being received and a second optional element as a last optional element output before the first optional element among the two or more of the plurality of optional elements, and determine whether selection of one of the first optional element and the second optional element is successful;
   when the selection of the one of the first optional element and the second optional element is successful, output a response for notifying one optional element to be executed among the two or more of the plurality of optional elements;
   when the selection of the one of the first optional element and the second optional element is not successful, output an audio prompt comprising at least part of the first optional element and the second optional element for requesting to specify one optional element to be executed, receive a third voice input for specifying the one optional element; and
   execute the function on an object associated with the one optional element.

2. The electronic device of claim 1, wherein, when text data generated from the second voice input lacks text data related to the function, the processor is configured to maintain the outputting of the response through the speaker.

3. The electronic device of claim 1,
   wherein the processor is configured to:
   receive, through the microphone, a fourth voice input at a time point prior to a time point when the second voice input was initially received, while a first optional element among the plurality of optional elements is output at a designated turn in the consecutive sequence of turns;
   interrupt the output of the response at the time point when the fourth voice input is received;
   when text data generated from the fourth voice input indicates a previous turn rather than the designated turn, output the second optional element; and
   when the text data generated from the fourth voice input indicates a next turn rather than the designated turn, output a third optional element corresponding to the next turn in the consecutive sequence of turns from among the plurality of optional elements.

4. The electronic device of claim 1, wherein the response includes a request for information related to executing the function, and wherein the processor is configured to:
- when text data generated from the second voice input includes the requested information, configure the information using at least a part of the generated text data.

5. The electronic device of claim 1, wherein the response includes a request to confirm execution of the function, and
- wherein the processor is configured to execute the function when text data generated from the second voice input indicates confirmation of the execution.

6. The electronic device of claim 1, wherein, when text data generated from the second voice input requests execution of a connected function associated with the function, the processor is configured to execute the connected function.

7. The electronic device of claim 1, wherein the processor is configured to output, through the speaker, an audio prompt request confirmation of whether to continue outputting the response, when insufficient information for execution of the function is acquired.

8. A method in an electronic device, the method comprising:
- receiving a first voice input through a microphone;
- outputting a response to the first voice input related to a function through a speaker, based on the first voice input, wherein the response includes a plurality of optional elements that are output in a consecutive sequence of turns;
- when a second voice input is received through the microphone during output of the response so that two or more of the plurality of optional elements are output, interrupting the output of the response and continuing to receive the second voice input; and
- based on the second voice input, selecting one of a first optional element currently being output upon the second voice input being received and a second optional element as a last optional element output before the first optional element among the two or more of the plurality of optional elements, and determining whether selection of the one of the first optional element and the second optional element is successful;
- when the selection of the one of the first optional element and the second optional element is successful, outputting a response for notifying one optional element to be executed among the two or more of the plurality of optional elements;
- when the selection of the one of the first optional element and the second optional element is not successful, outputting an audio prompt comprising at least part of the first optional element and the second optional element for requesting to specify one optional element to be executed, and receiving a third voice input for specifying the one optional element;
- executing the function on an object associated with the one optional element.

9. The method of claim 8, wherein, when text data generated from the second voice input lacks text data related to the function, the output of the response through the speaker is maintained.

10. The method of claim 8, further comprising:
- receiving, through the microphone, a fourth voice input at a time point prior to a time point when the second voice input was initially received, while a first optional element among the plurality of optional elements is output at a designated turn in the consecutive sequence of turns;
- interrupting output of the response at the time point when the fourth voice input is received;
- when text data generated from the fourth voice input indicates a previous turn rather than the designated turn, outputting the second optional element; and
- when the text data generated from the fourth voice input indicates a next turn rather than the designated turn, outputting a third optional element corresponding to the next turn in the consecutive sequence of turns from among the plurality of optional elements.

11. The method of claim 8, wherein the response includes a request for information related to executing the function, the method further comprising:
- when text data generated from the second voice input includes the requested information, configuring the information using at least a part of the generated text data.

12. The method of claim 8, wherein the response includes a request to confirm execution of the function, the method further comprising:
- executing the function when text data generated from the second voice input indicates confirmation of the execution of the function.

13. The method of claim 8, further comprising:
- when text data generated from the second voice input includes text data requesting execution of a connected function associated with the function, executing the connected function.

14. The method of claim 8, further comprising:
- outputting, through the speaker, an audio prompt requesting confirmation of whether to continue outputting the response, when insufficient information for execution of the function is acquired.

* * * * *